(12) United States Patent
Kawamura

(10) Patent No.: US 11,329,465 B2
(45) Date of Patent: May 10, 2022

(54) WATER-PROOF LOCK STRUCTURE, ELECTRIC CONNECTION BOX, AND APPARATUS

(71) Applicant: Yazaki Corporation, Tokyo (JP)

(72) Inventor: Yukihiro Kawamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 490 days.

(21) Appl. No.: 16/430,945

(22) Filed: Jun. 4, 2019

(65) Prior Publication Data

US 2019/0379193 A1 Dec. 12, 2019

(30) Foreign Application Priority Data

Jun. 7, 2018 (JP) .............................. JP2018-109346

(51) Int. Cl.

| | |
|---|---|
| *H02G 3/16* | (2006.01) |
| *B60R 16/02* | (2006.01) |
| *H01R 13/518* | (2006.01) |
| *H01R 13/52* | (2006.01) |
| *H01R 13/62* | (2006.01) |
| *H05K 5/02* | (2006.01) |

(52) U.S. Cl.
CPC ........... *H02G 3/16* (2013.01); *B60R 16/0215* (2013.01); *H01R 13/518* (2013.01); *H01R 13/5213* (2013.01); *H01R 13/62* (2013.01); *H05K 5/02* (2013.01)

(58) Field of Classification Search
None
See application file for complete search history.

(56) References Cited

U.S. PATENT DOCUMENTS

| | | | | |
|---|---|---|---|---|
| 3,840,152 A | * | 10/1974 | Hodge ................. | B65D 21/022 220/783 |
| 4,209,107 A | * | 6/1980 | Crisci ................ | B65D 43/0212 220/781 |
| 4,349,119 A | * | 9/1982 | Letica ..................... | B65D 1/22 220/659 |

(Continued)

FOREIGN PATENT DOCUMENTS

| | | |
|---|---|---|
| EP | 2 445 070 A1 | 4/2012 |
| EP | 3578419 A1 * | 12/2019 ............... H05K 5/02 |

(Continued)

*Primary Examiner* — Timothy J. Dole
*Assistant Examiner* — Muhammed Azam
(74) *Attorney, Agent, or Firm* — Kenealy Vaidya LLP

(57) ABSTRACT

A lock structure includes: an engaged body; and an engaging body capable of inserting and removing the engaged body along insertion and removal directions opposite to each other. An engaged body includes first and second engaged walls disposed opposite to each other at an interval, a connection wall which connects end portions on the insertion direction side thereof, and an engaged protrusion protruding from an outer wall surface of the second engaged wall. An engaging body has first and second engaging walls in which a space between the respective inner wall surfaces is defined as an accommodation space of the engaged body, an engaging protrusion protruding from the inner wall surface of the second engaging wall and capable of locking the engaged protrusion on the removal direction side, and a third engaging wall disposed between the first and second engaging walls.

18 Claims, 14 Drawing Sheets

(56) References Cited

U.S. PATENT DOCUMENTS

| | | | | |
|---|---|---|---|---|
| 4,959,018 A * | 9/1990 | Yamamoto | ............ | H01R 9/2458 |
| | | | | 174/559 |
| 5,048,715 A * | 9/1991 | Wolff | ................... | B65D 43/168 |
| | | | | 220/832 |
| 5,310,075 A * | 5/1994 | Wyler | ..................... | F21V 31/00 |
| | | | | 174/50 |
| 5,494,245 A * | 2/1996 | Suzuki | ................. | F16L 3/1075 |
| | | | | 24/487 |
| 5,531,345 A * | 7/1996 | Nakamura | ............. | H02G 3/088 |
| | | | | 220/3.8 |
| 5,574,254 A * | 11/1996 | Mori | ...................... | H02G 3/088 |
| | | | | 174/561 |
| 5,586,916 A * | 12/1996 | Shinji | .................. | H01R 13/501 |
| | | | | 439/448 |
| 5,703,325 A * | 12/1997 | Yamaguchi | ............ | H02G 3/088 |
| | | | | 174/50 |
| 5,938,063 A * | 8/1999 | Hoftman | ............. | B65D 43/164 |
| | | | | 220/326 |
| 6,568,551 B2 * | 5/2003 | Grossenbacher | ...... | H05K 5/063 |
| | | | | 220/4.02 |
| 6,572,588 B1 * | 6/2003 | Bierman | ............... | A61M 25/02 |
| | | | | 128/DIG. 26 |
| 6,659,792 B2 * | 12/2003 | Saka | .................. | H01R 13/5213 |
| | | | | 174/50.52 |
| 8,474,645 B2 * | 7/2013 | Sato | .................... | B60R 16/0238 |
| | | | | 220/324 |
| 8,785,775 B2 * | 7/2014 | Takeuchi | ............... | H02G 3/088 |
| | | | | 174/67 |
| 8,813,984 B2 * | 8/2014 | Satoh | ................... | H05K 5/063 |
| | | | | 220/4.21 |
| 8,884,160 B2 * | 11/2014 | Hara | ................... | B60R 16/0238 |
| | | | | 174/50 |
| 8,915,394 B2 * | 12/2014 | I | .............................. | H02G 3/088 |
| | | | | 220/378 |
| 9,083,165 B2 * | 7/2015 | Makino | ................. | H02G 3/088 |
| 9,521,772 B2 * | 12/2016 | Etlinger | ............... | H05K 5/0017 |
| 9,723,740 B2 * | 8/2017 | Yang | .................... | H05K 5/0052 |
| 9,819,168 B2 * | 11/2017 | Shiraki | ................ | B60R 16/0238 |
| 9,954,310 B2 * | 4/2018 | Ogasawara | ........ | H01R 13/6272 |
| 10,305,267 B2 * | 5/2019 | Kawada | ................. | H02G 3/081 |
| 10,644,490 B2 * | 5/2020 | Kawamura | ............ | H02G 3/083 |
| 2002/0084271 A1 * | 7/2002 | Sato | ....................... | H02G 3/088 |
| | | | | 220/3.8 |
| 2002/0157847 A1 * | 10/2002 | Chiriku | ............... | B60R 16/0238 |
| | | | | 174/50 |
| 2003/0109150 A1 * | 6/2003 | Saka | ............... | H01R 13/5213 |
| | | | | 439/76.2 |
| 2003/0136780 A1 * | 7/2003 | Sato | ....................... | H02G 3/088 |
| | | | | 220/3.8 |
| 2010/0127012 A1 * | 5/2010 | Takeuchi | ............... | H02G 3/088 |
| | | | | 220/810 |
| 2012/0085766 A1 * | 4/2012 | I | ............................ | H02G 3/088 |
| | | | | 220/378 |
| 2012/0091154 A1 * | 4/2012 | Satoh | ................... | H05K 5/0026 |
| | | | | 220/660 |
| 2012/0097693 A1 * | 4/2012 | Takeuchi | ............... | H02G 3/088 |
| | | | | 220/810 |
| 2014/0311793 A1 * | 10/2014 | Kaneko | ............... | B60R 16/0238 |
| | | | | 174/560 |
| 2016/0141131 A1 * | 5/2016 | Kawamura | ............ | H01H 50/04 |
| | | | | 335/202 |
| 2016/0315459 A1 * | 10/2016 | Nakashima | .......... | H05K 5/0247 |
| 2018/0103556 A1 * | 4/2018 | Tashiro | ................ | H05K 5/0217 |
| 2018/0312122 A1 * | 11/2018 | Kakimi | ................ | B60R 16/0207 |
| 2018/0337522 A1 | 11/2018 | Matsui | | |
| 2018/0342859 A1 * | 11/2018 | Kiyota | ................ | B60R 16/0239 |
| 2019/0348826 A1 * | 11/2019 | Ikeda | ................ | B60R 16/0207 |
| 2019/0376542 A1 * | 12/2019 | Kawamura | ............ | B60R 16/0239 |
| 2019/0379191 A1 * | 12/2019 | Kawamura | ............ | B60R 16/0238 |
| 2019/0379193 A1 * | 12/2019 | Kawamura | ............... | H02G 3/14 |
| 2019/0379194 A1 * | 12/2019 | Kawamura | ......... | B60R 16/0239 |

FOREIGN PATENT DOCUMENTS

| | | | | |
|---|---|---|---|---|
| JP | 2582762 Y2 * | 10/1998 | ............ | H02G 3/086 |
| JP | 2006-50823 A | 2/2006 | | |
| JP | 2013-70560 A | 4/2013 | | |
| JP | 2019198144 A * | 11/2019 | .......... | H05K 5/0247 |
| WO | 2014/196333 A1 | 12/2014 | | |

* cited by examiner

WATER-PROOF LOCK STRUCTURE, ELECTRIC CONNECTION BOX, AND APPARATUS

CROSS-REFERENCE TO RELATED APPLICATION(S)

The present application claims priority to and incorporates by reference the entire contents of Japanese Patent Application No. 2018-109346 filed in Japan on Jun. 7, 2018.

BACKGROUND OF THE INVENTION

1. Field of the Invention

The present invention relates to a lock structure, an electric connection box and a wire harness.

2. Description of the Related Art

In the related art, there is known a lock structure for keeping two components to be assembled in an assembled state (Japanese Patent Application Laid-open No. 2006-50823 and Japanese Patent Application Laid-open No. 2013-70560). The lock structure is applied to, for example, an electric connection box which accommodates electronic components, and an electric connection box which accommodates the electronic components and electric wires and forms a wire harness together with the electric wires drawn outward. In the electric connection box, two fitting members for fitting the peripheral edge portions of an opening are provided as constituent components of a housing. In the electric connection box, the lock structure is used to keep the two fitting members in a fitted state. The lock structure includes an engaged body provided on one of the two fitting members, and an engaging body provided on the other thereof. The lock structure holds the two fitting members in the fitted state by engaging the engaged body and the engaging body with each other when the two fitting members are fitted together.

Incidentally, in the electric connection box, various measures have been taken to suppress entry of liquid such as water to the inside of the housing. The measures should be taken not only in the fitting parts of the two fitting members, but also in the lock structure if a gap or the like between the engaged body and the engaging body is continuous with the inside of the housing. Therefore, it is desirable that the lock structure can suppress the entry of the liquid into the gap or the like between the engaged body and the engaging body, and can suppress the entry of the liquid into the inside of the housing via the gap or the like.

SUMMARY OF THE INVENTION

Therefore, an object of the present invention is to provide a lock structure, an electric connection box and a wire harness which can suppress the entry of liquid.

In order to achieve the above mentioned object, a lock structure according to one aspect of the present invention includes an engaged body; and an engaging body capable of inserting and removing the engaged body along insertion and removal directions opposite to each other, and capable of locking the inserted engaged body in the insertion direction and the removal direction, respectively, wherein the engaged body has first and second engaged walls disposed opposite to each other at an interval in an orthogonal direction to the insertion and removal directions, a connection wall that connects end portions on the insertion direction side of the first and second engaged walls, and an engaged protrusion protruding from an outer wall surface of the second engaged wall, the engaging body has first and second engaging walls that are disposed opposite to each other at an interval in an opposite arrangement direction of the first and second engaged walls and in which a space between respective inner wall surfaces is defined as an accommodation space of the engaged body, an engaging protrusion protruding from the inner wall surface of the second engaging wall and capable of locking the engaged protrusion on the removal direction side when the engaged body inserted into the accommodation space from the connection wall side is in an accommodated state, and a third engaging wall disposed opposite to the respective inner wall surfaces at an interval between the first and second engaging walls, the third engaging wall has a locker capable of locking the connection wall on the insertion direction side when in the accommodated state, and the second engaging wall has a shape and arrangement capable of blocking liquid going straight from the outside toward a part between the connection wall and the locker disposed opposite to each other in the insertion and removal directions when in the accommodated state.

According to another aspect of the present invention, in the lock structure, it is desirable that the connection wall, the second engaging wall, and the third engaging wall are formed and disposed so that the part between the connection wall and the locker disposed opposite to each other in the insertion and removal directions when in the accommodated state overlaps the second engaging wall in the opposite arrangement direction.

According to still another aspect of the present invention, in the lock structure, it is desirable that the third engaging wall has a liquid-proof protrusion protruding toward the inner wall surface of the second engaging wall on the insertion direction side of the part between the connection wall and the locker disposed opposite to each other in the insertion and removal directions when in the accommodated state, and the liquid-proof protrusion extends over a length range of a longer length in orthogonal directions to the insertion and removal directions and the opposite arrangement direction, in the connection wall and the locker disposed opposite to each other in the insertion and removal directions when in the accommodated state.

According to still another aspect of the present invention, in the lock structure, it is desirable that the engaged body has a guide protrusion that is connected to the connection wall, protrudes in the insertion direction side, and is disposed between the first engaging wall and the third engaging wall when in the accommodated state, and the guide protrusion extends over a length range of a longer length in the orthogonal directions to the insertion and removal directions and the opposite arrangement direction, in the connection wall and the locker disposed opposite to each other in the insertion and removal directions when in the accommodated state.

According to still another aspect of the present invention, in the lock structure, it is desirable that the engaged body is provided on an outer wall surface side of a peripheral wall body of a first fitting member, and forms the first engaged wall, using a part of the peripheral wall body of the first fitting member, the engaging body is provided on a first peripheral wall body of a second fitting member having an opening peripheral edge portion disposed opposite to the inner wall surface of the opening peripheral edge portion in the peripheral wall body of the first fitting member, and a second peripheral wall body of the second fitting member having an opening peripheral edge portion disposed opposite to the outer wall surface of the opening peripheral edge portion of the peripheral wall body, the first engaging wall is formed, using a part of the first peripheral wall body, the accommodation space is formed by a notch formed by notching a part of the opening peripheral edge portion of the second peripheral wall body, and the third engaging wall is formed, using the insertion direction side of the notch of the second peripheral wall body.

In order to achieve the above mentioned object, an electric connection box according to still another aspect of the present invention includes a housing that accommodates electronic component in the housing, wherein the housing has at least first and second fitting members to be fitted to each other, and has a lock structure that holds a fitted state of the first and second fitting members, the lock structure includes an engaged body provided on the first fitting member, and an engaging body provided on the second fitting member, capable of inserting and removing the engaged body in insertion and removal directions opposite to each other, and capable of locking the inserted engaged body in the insertion direction and the removal direction, respectively, the engaged body has first and second engaged walls disposed opposite to each other at an interval in an orthogonal direction to the insertion and removal directions, a connection wall that connects end portions on the insertion direction side of the first and second engaged walls, and an engaged protrusion protruding from an outer wall surface of the second engaged wall, the engaging body has first and second engaging walls that are disposed opposite to each other at an interval in an opposite arrangement direction of the first and second engaged walls and in which a space between respective inner wall surfaces is defined as an accommodation space of the engaged body, an engaging protrusion protruding from the inner wall surface of the second engaging wall and capable of locking the engaged protrusion on the removal direction side when the engaged body inserted into the accommodation space from the connection wall side is in an accommodated state, and a third engaging wall disposed opposite to the respective inner wall surfaces at an interval between the first and second engaging walls, the third engaging wall has a locker capable of locking the connection wall on the insertion direction side when in the accommodated state, and the second engaging wall has a shape and arrangement capable of blocking liquid going straight from the outside toward a part between the connection wall and the locker disposed opposite to each other in the insertion and removal directions when in the accommodated state.

In order to achieve the above mentioned object, a wire harness according to still another aspect of the present invention includes an electronic component; an electric wire electrically connected to the electronic component; and a housing that accommodates the electronic component and the electric wire in the housing and draws the electric wire to an outer side from an inner side, wherein the housing has at least first and second fitting members to be fitted to each other, and has a lock structure that holds a fitted state of the first and second fitting members, the lock structure includes an engaged body provided on the first fitting member, and an engaging body provided on the second fitting member, capable of inserting and removing the engaged body in insertion and removal directions opposite to each other, and capable of locking the inserted engaged body in the insertion direction and the removal direction, respectively, the engaged body has first and second engaged walls disposed opposite to each other at an interval in an orthogonal direction to the insertion and removal directions, a connection wall which connects end portions on the insertion direction side of the first and second engaged walls, and an engaged protrusion protruding from an outer wall surface of the second engaged wall, the engaging body has first and second engaging walls that are disposed opposite to each other at an interval in an opposite arrangement direction of the first and second engaged walls and in which a space between respective inner wall surfaces is defined as an accommodation space of the engaged body, an engaging protrusion protruding from the inner wall surface of the second engaging wall and capable of locking the engaged protrusion on the removal direction side when the engaged body inserted into the accommodation space from the connection wall side is in an accommodated state, and a third engaging wall disposed opposite to the respective inner wall surfaces at an interval between the first and second engaging walls, the third engaging wall has a locker capable of locking the connection wall on the insertion direction side when in the accommodated state, and the second engaging wall has a shape and arrangement capable of blocking liquid going straight from the outside toward a part between the connection wall and the locker disposed opposite to each other in the insertion and removal directions when in the accommodated state.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
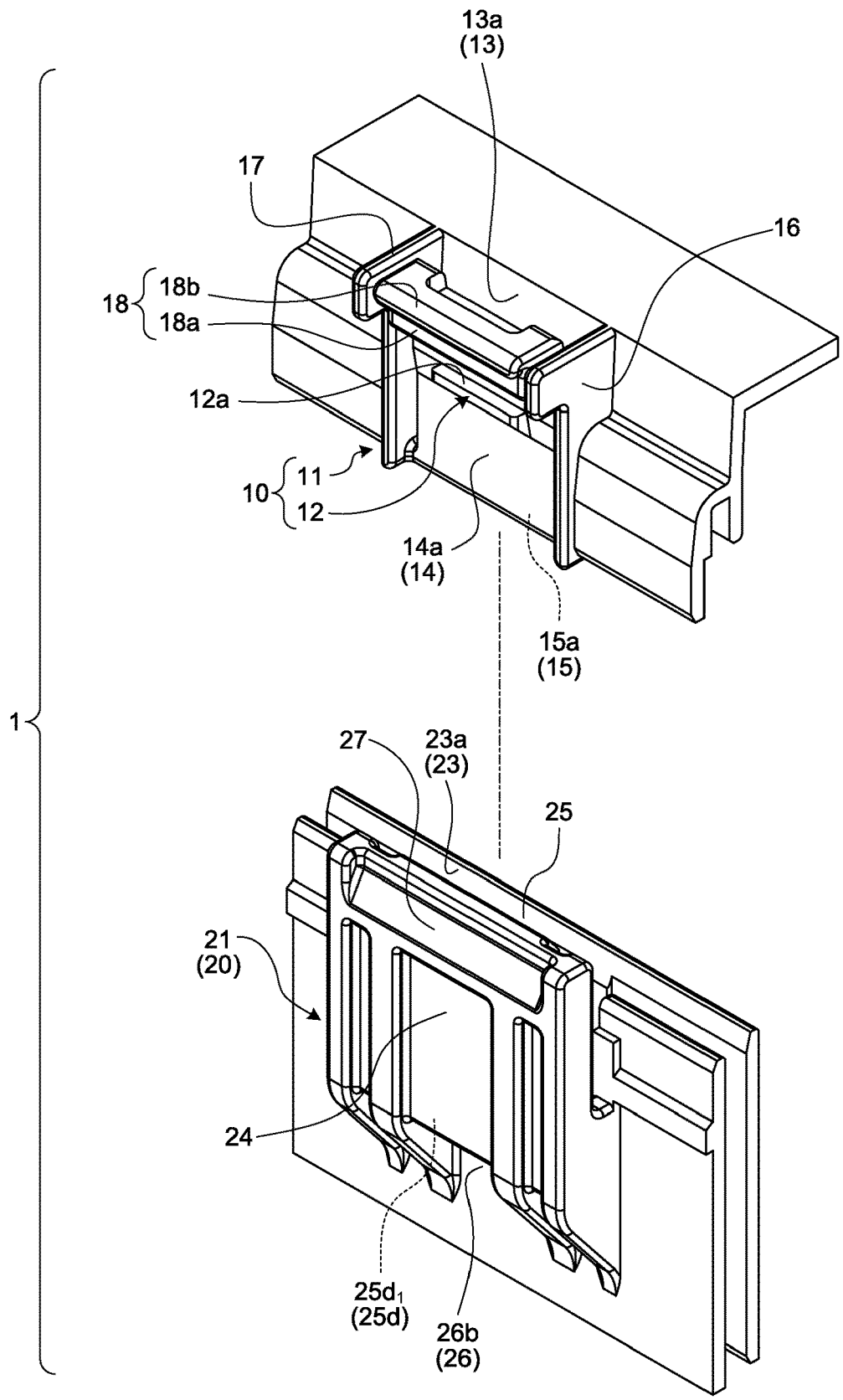
FIG. 1 is a perspective view illustrating a state before engagement of a lock structure of an embodiment.

Hereinafter, embodiments of a lock structure, an electric connection box, and a wire harness according to the present invention will be described in detail on the basis of the drawings. Incidentally, the present invention is not limited by the embodiments.

Embodiment

One of the embodiments of the lock structure, the electric connection box and the wire harness according to the present invention will be described on the basis of FIGS. 1 to 14.

Reference numeral 1 of FIGS. 1 to 7 denotes a lock structure of this embodiment for holding two fitting members in a fitted state. The two fitting members are, for example, members for forming a housing 110 to be described later. The lock structure 1 includes an engaged body 10, and an engaging body 20 capable of inserting and removing the engaged body 10 in insertion and removal directions opposite to each other and capable of locking the inserted engaged body 10 in the insertion direction and the removal direction. The engaged body 10 and the engaging body 20 are molded of an insulating material such as a synthetic resin. In the lock structure 1, the engaged body 10 is provided on one fitting member, and the engaging body 20 is provided on the other fitting member.

Incidentally, hereinafter, when simply describing as the insertion direction or the removal direction, the insertion direction or the removal direction of the engaged body 10 with respect to the engaging body 20 will be represented.

Figure 2:
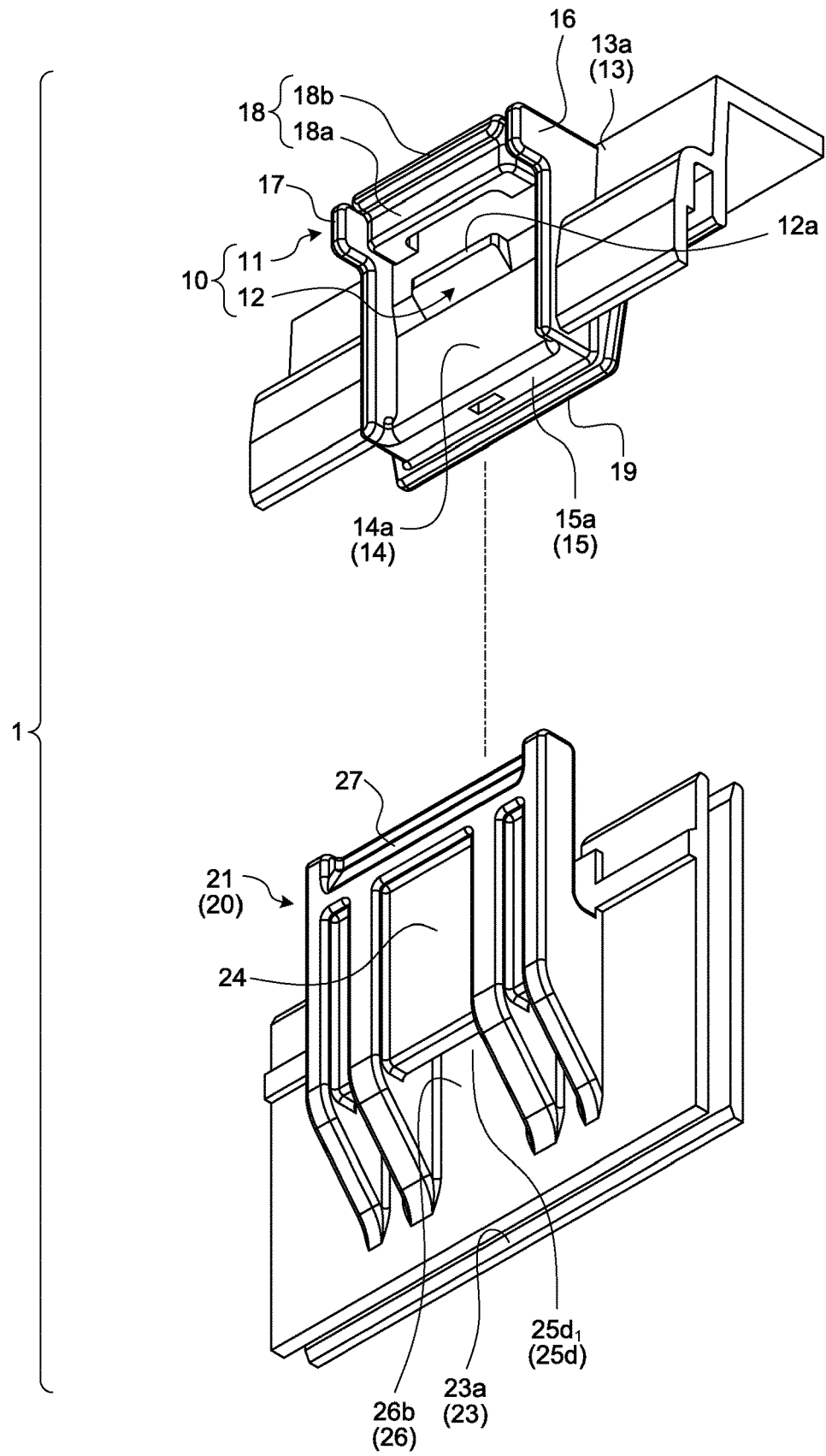
FIG. 2 is a perspective view of a state before engagement of the lock structure of the embodiment as viewed from another angle.
Figure 3:
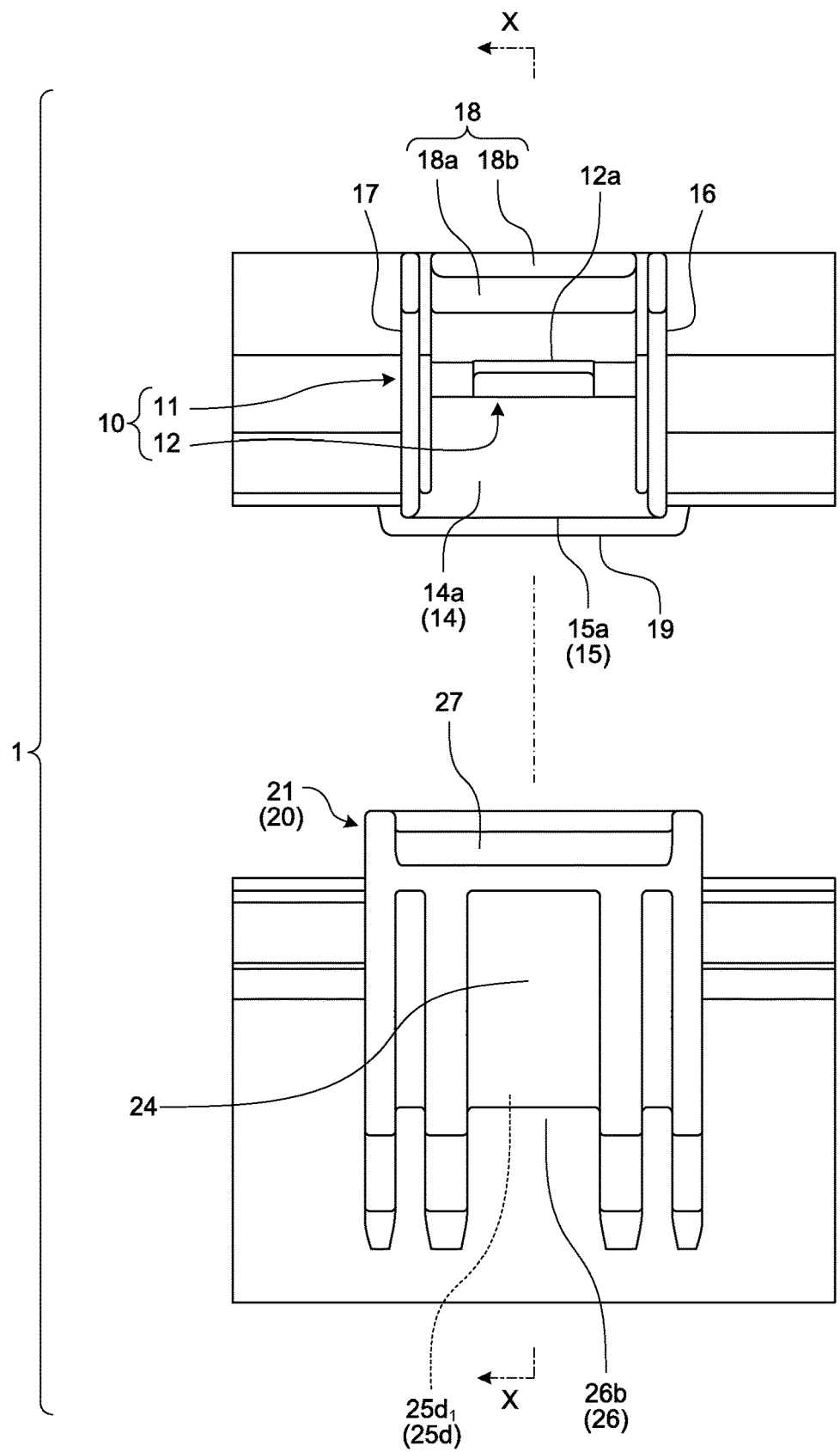
FIG. 3 is a front view illustrating a state before engagement of the lock structure of the embodiment.
Figure 4:
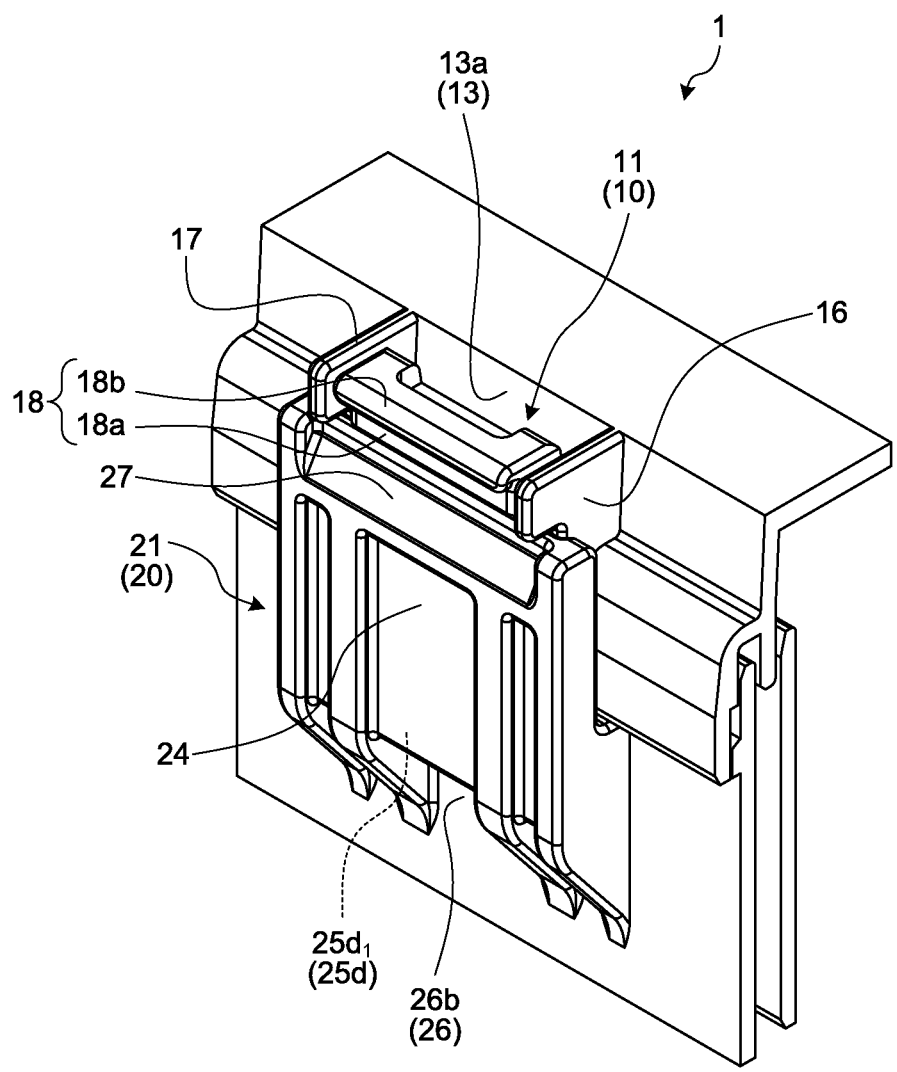
FIG. 4 is a perspective view illustrating a state after engagement of the lock structure of the embodiment.
Figure 5:
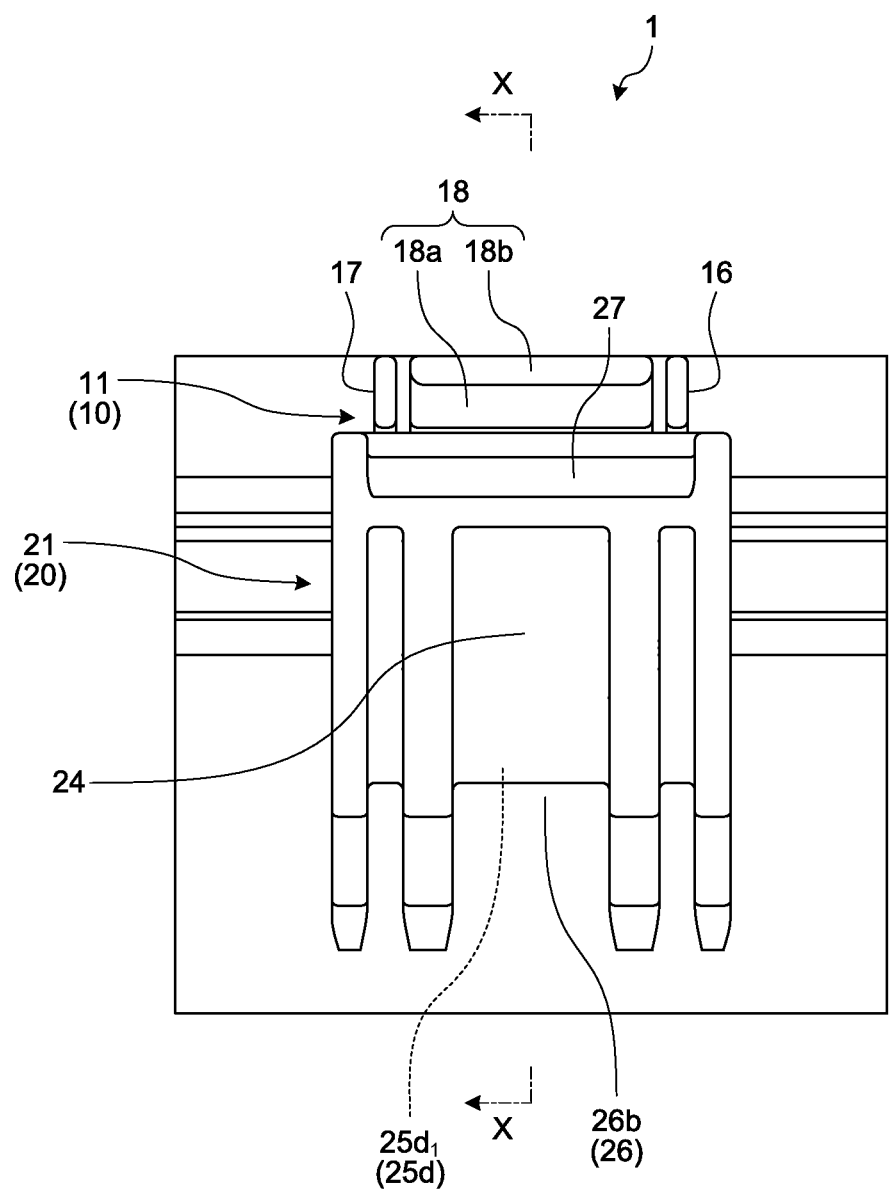
FIG. 5 is a front view illustrating a state after engagement of the lock structure of the embodiment.

The engaged body 10 has a main body (hereinafter, referred to as an "engaged main body") 11 capable of being inserted and removed with respect to the engaging body 20, and a protrusion (hereinafter, referred to as an "engaged protrusion") 12 protruding from an outer wall surface of the engaged main body 11 (FIGS. 1 to 3).

The engaged main body 11 of this example has first and second walls (hereinafter, referred to as "first and second engaged walls") 13 and 14 disposed opposite to each other at an interval in an orthogonal direction to the insertion and removal directions (FIGS. 1, 2, 6 and 7). Further, the engaged main body 11 of this example has a wall (hereinafter, referred to as a "connection wall") 15 that connects end portions of the first and second engaged walls 13 and 14 on the insertion direction side (FIGS. 1 to 3, 6 and 7). The first and second engaged walls 13 and 14 are formed in, for example, a rectangular flat plate shape. Further, in the engaged main body 11, the end portions on the insertion direction side of the first and second engaged walls 13 and 14 are connected by a rectangular flat plate-like connection wall 15. In the engaged main body 11 of this example, the second engaged wall 14 has flexibility, and the second engaged wall 14 can be tilted with a root on the connection wall 15 side as a fulcrum.

Furthermore, the engaged main body 11 of this example has third and fourth walls (hereinafter, referred to as "third and fourth engaged walls") 16 and 17 with the first and second engaged walls 13 and 14 and the connection wall 15 interposed therebetween, in an orthogonal direction (hereinafter, referred to as a "width direction") to the insertion and removal directions and the opposite arrangement direction of the first and second engaged walls 13 and 14 (FIGS. 1 to 5). The third and fourth engaged walls 16 and 17 are disposed opposite to each other at an interval in the width direction. Each of the third and fourth engaged walls 16 and 17 is disposed at an interval in the width direction with respect to the second engaged wall 14 in order to secure the flexibility of the second engaged wall 14. Meanwhile, the third and fourth engaged walls 16 and 17 are connected to the first engaged wall 13 and the connection wall 15, respectively. Each of the third and fourth engaged walls 16 and 17 of this example is provided vertically from an inner wall surface 13a of the first engaged wall 13 toward the second engaged wall 14 side, and is vertically provided in the removal direction from the end portion of the connection wall 15 in the width direction (FIG. 2). Incidentally, hereinafter, when the direction is simply described as the opposite arrangement direction, the same direction as the opposite arrangement direction of the first and second engaged walls 13 and 14 will be represented.

In the engaged body 10, the engaged protrusion 12 protrudes from an outer wall surface 14a of the second engaged wall 14. The engaged protrusion 12 of this example is formed in a claw shape in which an end surface on the removal direction side is set as a locked surface 12a (FIGS. 1 to 3, 6 and 7). In the lock structure 1, the engaged body 10 inserted into the engaging body 20 is locked in the removal direction by disposing the locked surface 12a and a locking surface 22a of an engaging protrusion 22 to be described later to face each other in the insertion and removal directions. The engaged main body 11 of this example has an operation unit 18 for releasing the locked state (FIGS. 1 to 7).

The operation unit 18 protrudes from the outer wall surface 14a of the second engaged wall 14. The operation unit 18 of this example is provided at the end portion (the end portion in the removal direction) of the outer wall surface 14a of the second engaged wall 14 on the side opposite to the connection wall 15 side. The operation unit 18 has a rectangular operation surface 18a disposed substantially parallel to the outer wall surface 14a at an interval in the protruding direction side, and a hook 18b located on the removal direction side of the operation surface 18a and protruding farther than the operation surface 18a (FIGS. 1 to 7). The operation surface 18a is a place in which an operator's finger pulp touches when releasing the locked state of the lock structure 1. In the lock structure 1, the operation surface 18a is pressed with the finger pulp to cause the second engaged wall 14 to be tilted, thereby releasing the opposite arrangement state of the locked surface 12a and the locking surface 22a in the insertion and removal directions. The hook 18b is a place to be pressed by the finger pulp with the operation surface 18a, and is also a place to hook the finger pulp. In the lock structure 1, the finger pulp is hooked on the hook 18b, and the engaged body 10 is pulled out from the engaging body 20 in the removal direction along with the tilted second engaged wall 14.

The engaging body 20 has a main body (hereinafter, referred to as an "engaging main body") 21 (FIGS. 1 to 7) which accommodates the engaged body 10, and a protrusion (hereinafter, referred to as an "engaging protrusion") 22 capable of locking the engaged protrusion 12 on the removal direction side when the engaged body 10 is in the accommodated state. (FIGS. 6 and 7).

Figure 6:
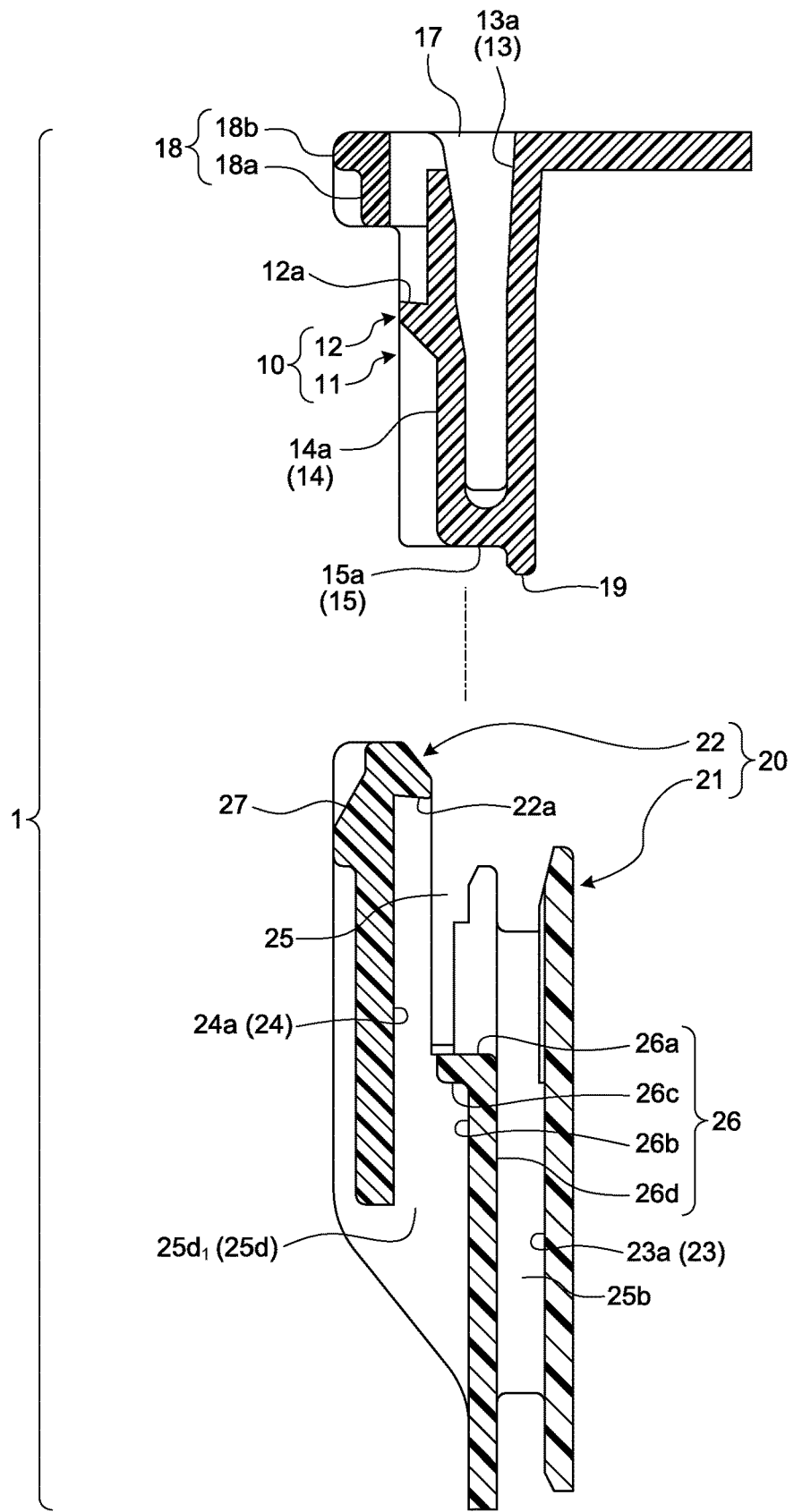
FIG. 6 is a cross-sectional view taken along the line X-X of FIG. 3.
Figure 7:
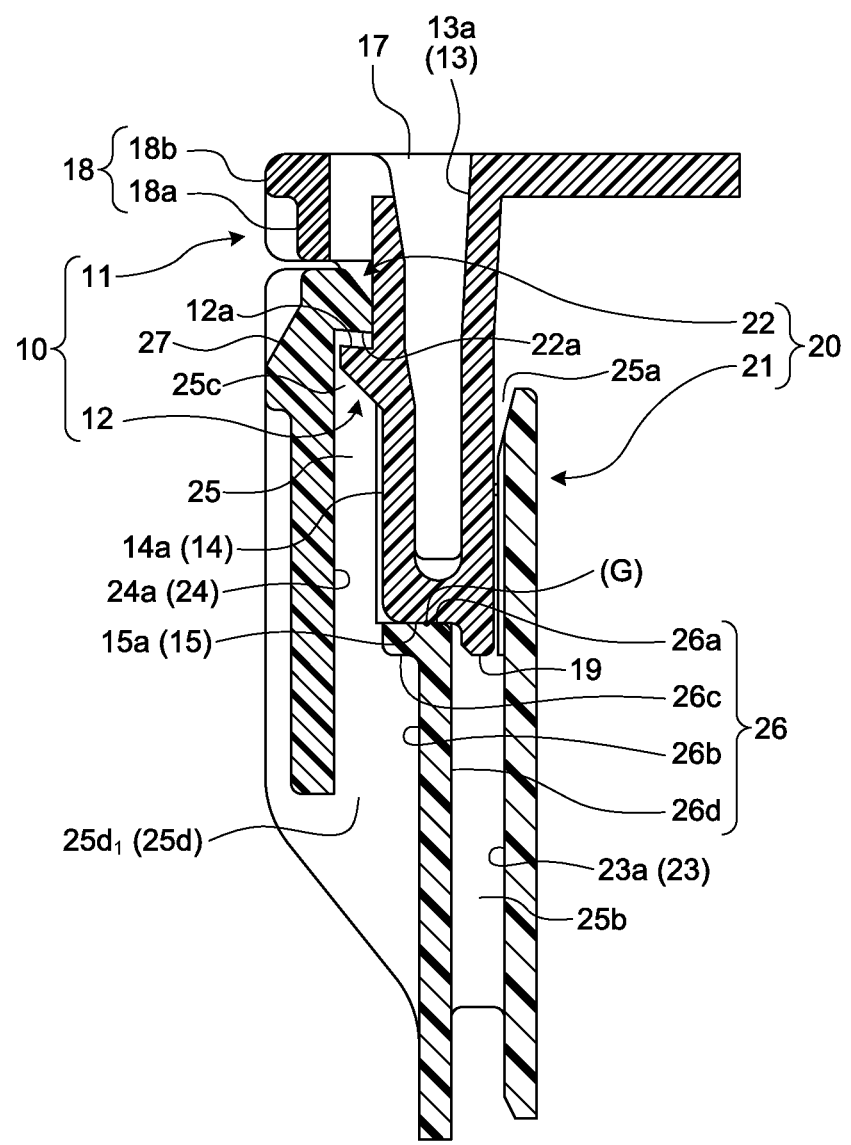
FIG. 7 is a cross-sectional view taken along the line X-X of FIG. 5.

The engaging main body 21 of this example has first and second walls (hereinafter, referred to as "first and second engaging walls") 23 and 24 which are disposed opposite to each other at an interval in the opposite arrangement direction of the first and second engaged walls 13 and 14 (FIGS. 1, 2, 6 and 7). In the engaging main body 21, a space between inner wall surfaces 23a and 24a of the first and second engaging walls 23 and 24 is set as an accommodation space 25 of the engaged body 10 (FIGS. 1, 6 and 7). The first and second engaging walls 23 and 24 are formed, for example, in a rectangular flat plate shape, and form a rectangular accommodation space 25. The engaged body 10 is inserted into the accommodation space 25 from the connection wall 15 side. The insertion direction side of the operation unit 18 in the engaged body 10 is accommodated in the accommodation space 25. In the engaged body 10, when being accommodated in the accommodation space 25, the operation unit 18 protrudes to the removal direction side of the engaging body 20, and the operation unit 18 is disposed opposite to the second engaging wall 24 on the removal direction side.

Figure 8:
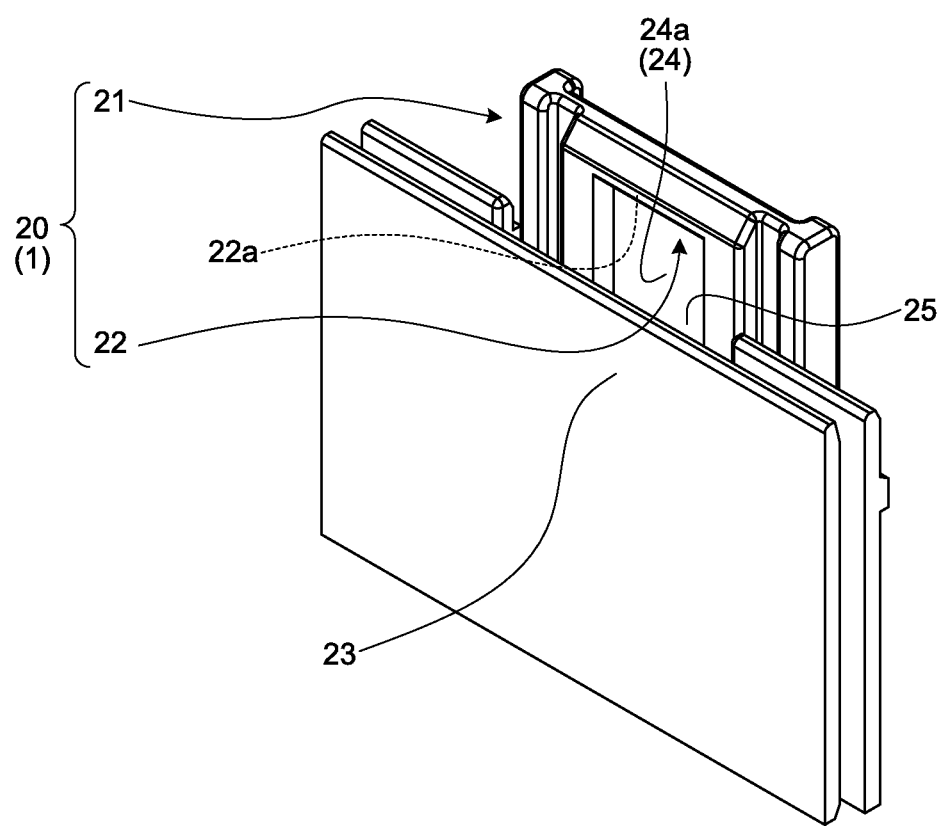
FIG. 8 is a perspective view of the engaging body as viewed from another angle.

In the engaging body 20, the engaging protrusion 22 protrudes from the inner wall surface 24a of the second engaging wall 24 (FIGS. 6 to 8). The engaging protrusion 22 of this example has an end surface on the insertion direction side as the locking surface 22a, and is provided at an end portion on the removal direction side of the inner wall surface 24a of the second engaging wall 24. In the lock structure 1, in conjunction with the insertion operation of the engaged body 10 into the accommodation space 25, the engaged protrusion 12 tilts the second engaged wall 14, while climbing over the engaging protrusion 22. In the lock structure 1, the position of the engaged body 10 in the accommodation space 25 when the engaged protrusion 12 climbs over the engaging protrusion 22 becomes an accommodation completion position of the engaged body 10 in the accommodation space 25. In the lock structure 1, when the engaged protrusion 12 climbs over the engaging protrusion 22, the tilted second engaged wall 14 returns to the original position, and the locked surface 12a of the engaged protrusion 12 and the locking surface 22a of the engaging protrusion 22 are disposed opposite to each other in the insertion and removal directions. Therefore, the movement of the engaged body 10 in the removal direction is locked at the accommodation completion position.

The engaging main body 21 of this example further includes a third wall (hereinafter, referred to as a "third engaging wall") 26 which is disposed opposite to the inner wall surfaces 23a and 24a of the first and second engaging walls 23 and 24 at an interval (FIGS. 2, 3, 6 and 7). The third engaging wall 26 is a wall which is disposed on the insertion direction side of the accommodation space 25 to lock the engaged body 10 so that the engaged body 10 reaching the accommodation completion position in the accommodation space 25 is not continuously inserted beyond the accommodation completion position. Therefore, the third engaging wall 26 has a locker 26a capable of locking the connection wall 15 on the insertion direction side when the engaged body 10 is in the accommodated state at the accommodation completion position (FIGS. 6 and 7). The locker 26a has a length in the width direction longer than the length of a wall surface 15a in the width direction to be able to lock the entire region in the width direction of the wall surface 15a (FIGS. 1 to 3, 6 and 7) of the end portion of the connection wall 15 on the insertion direction side. The third engaging wall 26 of this example is formed in a rectangular flat plate shape, and the end surface of one side on the removal direction side is used as the locker 26a.

Here, when the engaged body 10 is in the accommodated state at the accommodation completion position, the wall surface 15a of the connection wall 15 and the locker 26a are disposed opposite to each other in the insertion and removal directions. At this time, the wall surface 15a of the connection wall 15 and the locker 26a may be in contact with each other, or a gap G may be formed between them (FIG. 7).

There is a high possibility that the wall surface 15a of the connection wall 15 and the locker 26a are in contact with each other, for example, when the insertion direction of the engaged body 10 is directed to a lower side of a vehicle. On the other hand, there is a possibility that the gap G is formed between the wall surface 15a of the connection wall 15 and the locker 26a, for example, when the insertion direction is directed to the upper side of the vehicle or when vibration or the like at the time of traveling of the vehicle is input to the lock structure 1 even if the insertion direction is directed to the lower side of the vehicle. The gap G communicates with the accommodation space 25, and is connected to each of a first space 25a (FIG. 7) between the first engaged wall 13 and the first engaging wall 23, a second space 25b (FIGS. 6 and 7) between the first engaging wall 23 and the third engaging wall 26, a third space 25c (FIG. 7) between the second engaged wall 14 and the second engaging wall 24, and a fourth space 25d (FIGS. 1 to 7) between the second engaging wall 24 and the third engaging wall 26. In the lock structure 1, the first space 25a, the second space 25b, the third space 25c, and the fourth space 25d are connected to the outside, respectively. For example, when the lock structure 1 is applied to a housing 110 to be described later, the first space 25a and the second space 25b are connected to the inner space of the housing 110, and the third space 25c and the fourth space 25d are connected to the outside of the housing 110. Therefore, in the lock structure 1, even if the gap G is formed between the wall surface 15a of the connection wall 15 and the locker 26a, by suppressing the entry of liquid into the gap G from the third space 25c or the fourth space 25d, it is desirable to suppress the inflow of the liquid from the gap G to the first space 25a or the second space 25b and to suppress the entry of the liquid into the inner space of the housing 110.

Figure 9:
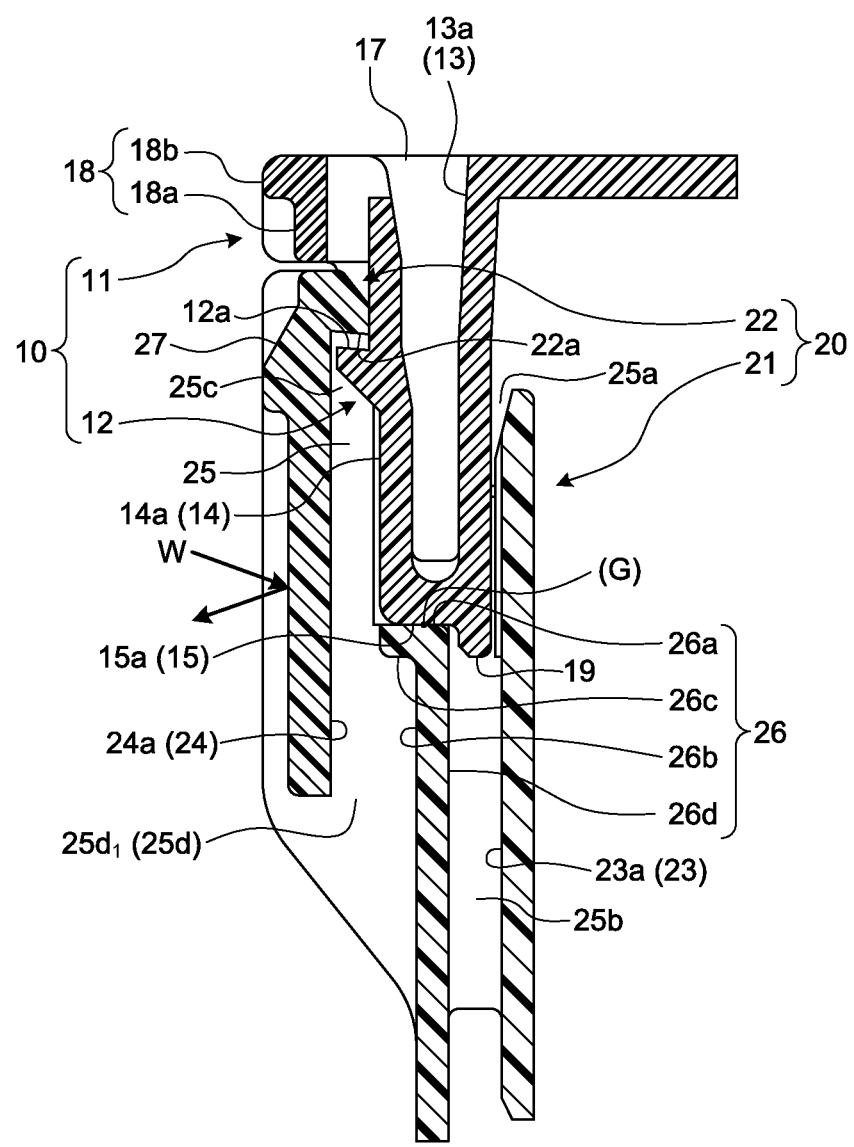
FIG. 9 is a diagram describing an example of a path of liquid.
Figure 10:
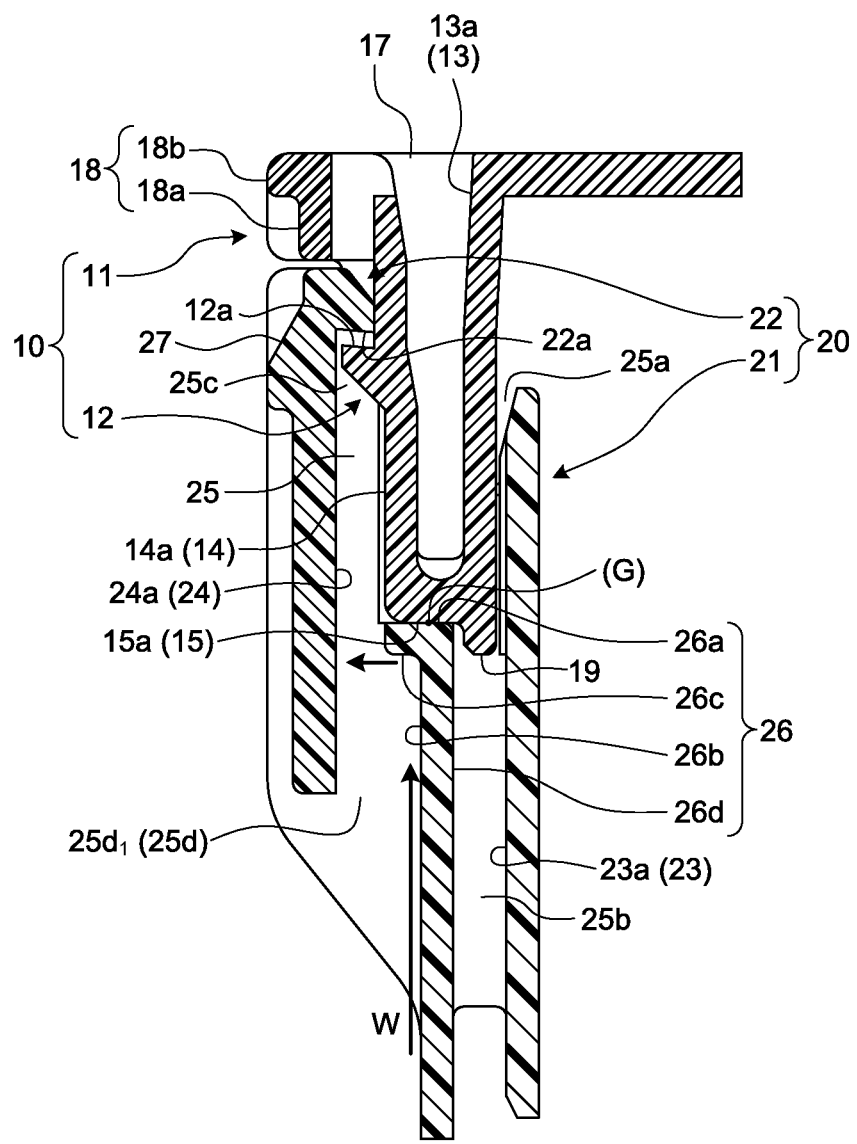
FIG. 10 is a diagram describing an example of the path of liquid.

For example, there is a possibility that liquid W outside the lock structure 1 goes straight from various directions toward a part between the wall surface 15a of the connection wall 15 and the locker 26a disposed opposite to each other in the insertion and removal directions, when the engaged body 10 is in the accommodated state at the accommodation completion position. The lock structure 1 of the present embodiment is configured so that the liquid W is prevented from entering the gap G, by blocking the liquid W going straight toward the part between the wall surface 15a of the connection wall 15 and the locker 26a, even if the gap G is formed between them. For this reason, the second engaging wall 24 of the present embodiment has a shape and arrangement capable of blocking the liquid W going straight from the outside toward the part between the wall surface 15a of the connection wall 15 and the locker 26a, when the engaged body 10 is in the accommodated state. Therefore, in the lock structure 1, the liquid W going straight from various directions toward the part between the wall surface 15a of the connection wall 15 and the locker 26a and the gap G formed between them can be blocked by the second engaging wall 24 (FIG. 9). Therefore, the lock structure 1 can suppress the entry of the liquid W into the part between the wall surface 15a of the connection wall 15 and the locker 26a and the gap G formed between them. In the lock structure 1, the connection wall 15, the second engaging wall 24 and the third engaging wall 26 are formed and disposed such that the part between the wall surface 15a of the connection wall 15 and the locker 26a and the gap G formed between them overlap the second engaging wall 24 in the opposite arrangement direction (FIGS. 6 and 7). For example, in the lock structure 1, by making the part between the wall surface 15a of the connection wall 15 and the locker 26a and the gap G formed between them overlap a central region in the insertion and removal directions of the second engaging wall 24 (more specifically, center) in the opposite arrangement direction, the liquid W going straight from such various directions is blocked by the second engaging wall 24.

In the lock structure 1 of the present embodiment, for example, the liquid W entering from an opening $25d_1$ (FIGS. 1 to 7) on the outer side of the fourth space 25d can be suppressed from directly going to the part between the wall surface 15a of the connection wall 15 and the locker 26a and the gap G formed between them, by the second engaging wall 24. However, there is a possibility that the liquid W entering from the opening $25d_1$ flows along a wall surface 26b (FIGS. 1 to 3, 6 and 7) of the third engaging wall 26, and is guided to the part between the wall surface 15a of the connection wall 15 and the locker 26a and the gap G formed between them. Therefore, the third engaging wall 26 of the present embodiment has a protrusion (hereinafter, referred to as a "liquid-proof protrusion") 26c that protrudes toward the inner wall surface 24a of the second engaging wall 24 on the insertion direction side of the part between the wall surface 15a of the connection wall 15 and the locker 26a disposed opposite to each other in the insertion and removal directions in the accommodated state (FIGS. 6 and 7). The liquid-proof protrusion 26c extends over the range of the longer length in the orthogonal direction (width direction) to the insertion and removal directions and the opposite arrangement direction, in the connection wall 15 and the locker 26a.

The liquid-proof protrusion 26c of this example protrudes toward the inner wall surface 24a of the second engaging wall 24 from the wall surface 26b of the third engaging wall 26 in the orthogonal direction. Further, the liquid-proof protrusion 26c of this example protrudes from an end portion on the removal direction side of the wall surface 26b of the third engaging wall 26 so that the end surface on the removal direction side is disposed on the same plane as that of the locker 26a. The liquid-proof protrusion 26c of this example is formed in a rectangular flat plate shape. In the lock structure 1, since the liquid W flowing along the wall surface 26b of the third engaging wall 26 can be blocked by the liquid-proof protrusion 26c (FIG. 10), it is possible to suppress the entry of the liquid W into the part between the wall surface 15a of the connection wall 15 and the locker 26a and the gap G formed between them.

In addition, there is also a possibility that the liquid W entering from the opening $25d_1$ rebounds or the like on the inner wall surface of the fourth space 25d and flows toward the part between the wall surface 15a of the connection wall 15 and the locker 26a and the gap G formed between them. Therefore, the lock structure 1 of the present embodiment is configured so that the liquid W entering the gap G by being rebounded or the like on the inner wall surface of the fourth space 25d is suppressed from entering the inner space of the housing 110. Thus, the engaged body 10 of the present embodiment has a protrusion (hereinafter, referred to as a "guide protrusion") 19 which is connected to the connection wall 15 and protrudes to the insertion direction side (see FIGS. 2, 3, 6 and 7). The guide protrusion 19 extends over the range of the longer length in the orthogonal direction (width direction) to the insertion and removal directions and the opposite arrangement direction, in the connection wall 15 and the locker 26a disposed opposite to each other in the insertion and removal directions in the accommodated state.

The guide protrusion 19 of this example protrudes in the orthogonal direction from the wall surface 15a of the connection wall 15 toward the insertion direction side.

Further, the guide protrusion 19 of this example protrudes in the orthogonal direction from the wall surface 15a of the connection wall 15 toward the insertion direction side, on the same plane as that of the first engaged wall 13. The guide protrusion 19 may protrude from the wall surface 15a of the connection wall 15 as a rectangular flat plate shape. However, the guide protrusion 19 of this example also protrudes from the outer wall surfaces of the third and fourth engaged walls 16 and 17, is continuously provided over the outer wall surface of the third engaged wall 16 from the wall surface 15a of the connection wall 15, and is continuously provided over the outer wall surface of the fourth engaged wall 17 from the wall surface 15a of the connection wall 15 (FIGS. 2 and 3).

Figure 11:
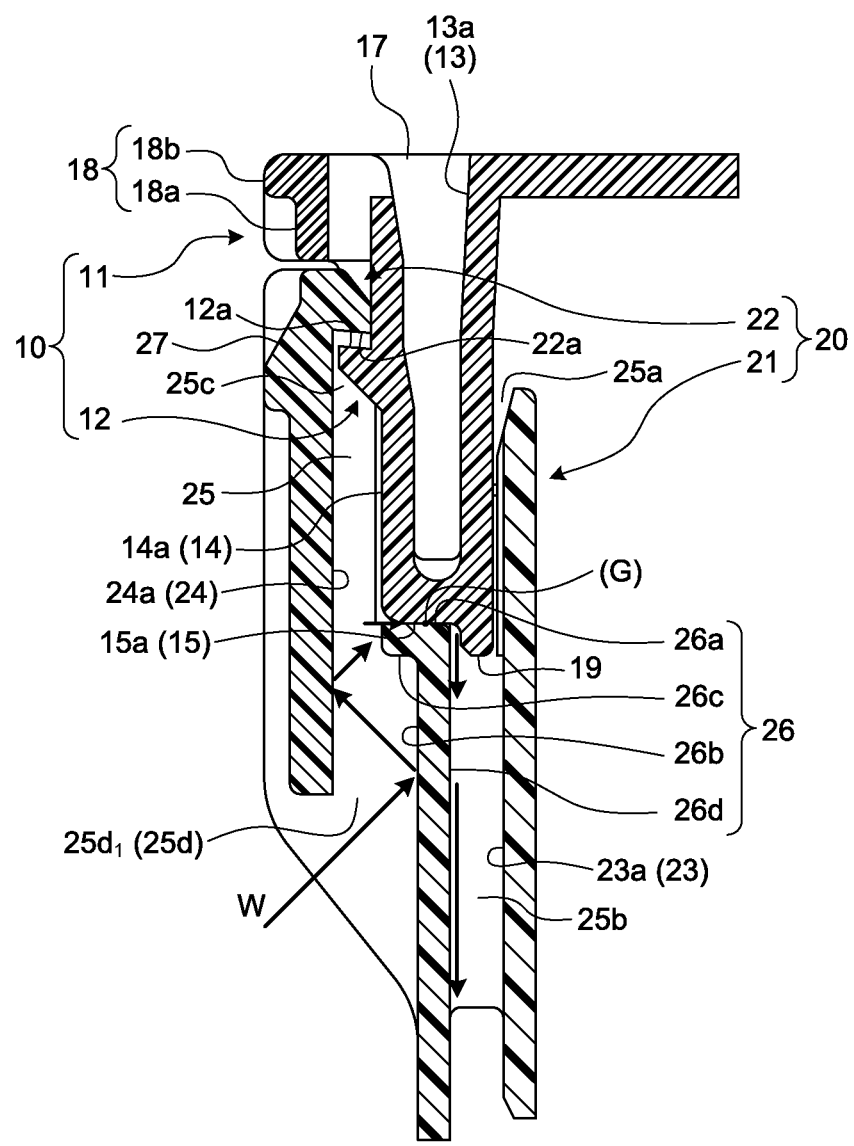
FIG. 11 is a diagram describing an example of the path of liquid.

In the lock structure 1, the liquid W entering the gap G can be blocked by the guide protrusion 19 and guided to the second space 25b (FIG. 11). Therefore, since the lock structure 1 can suppress the entry of the liquid W entering the gap G into the first space 25a, it is possible to suppress the entry of the liquid W into the inner space of the housing 110 through the first space 25a. Furthermore, in the lock structure 1 of this example, the liquid W guided to the second space 25b by the guide protrusion 19 can be guided by gravity along a wall surface 26d of the third engaging wall 26 (FIG. 11). As will be described later, in the housing 110 of this example, an opening peripheral edge portion 132d of the second fitting member 130 and an opening peripheral edge portion 141a of a third fitting member 140 connected to the third engaging wall 26 are disposed opposite to each other, and the gap between the opening peripheral edge portion 132d and the opening peripheral edge portion 141a is connected to the outside. Therefore, the lock structure 1 of this example can guide the liquid W guided to the second space 25b by the guide protrusion 19 from the gap between the opening peripheral edge portion 132d and the opening peripheral edge portion 141a to the outside of the housing 110. Therefore, from this point, the lock structure 1 of this example can also suppress the entry of the liquid W entering the gap G into the inner space of the housing 110.

As described above, the lock structure 1 of the present embodiment can suppress the entry of the liquid W into the gap G between the engaged body 10 and the engaging body 20 connected to the inside of the housing 110, by the second engaging wall 24 and the liquid-proof protrusion 26c. Further, even if the liquid W enters the gap G, the lock structure 1 of the present embodiment can suppress the entry of the liquid W into the inner space of the housing 110 by the guide protrusion 19.

Here, the engaging body 20 has an operation surface 27 connected to the operation surface 18a of the operation unit 18 of the engaged body 10 (FIGS. 1 to 7). The operation surface 27 is a place which the finger pulp of the operator touches when the locked state of the lock structure 1 is released, like the operation surface 18a. The lock structure 1 of the present embodiment can push the operation surface 18a with the finger pulp, while touching the two operation surfaces 18a and 27 with the finger pulp. That is, in the lock structure 1, the contact region of the finger pulp necessary for the release operation of the locked state is provided by being divided into two operation surfaces 18a and 27. Therefore, in the lock structure 1, the width in the insertion and removal directions of the operation surface 18a can be narrowed as compared with a case where the contact region of the finger pulp is secured only by the operation surface 18a of the engaged body 10. Accordingly, the protrusions of the engaged body 10 in the removal direction from the engaging body 20 decreases, and the overall physique in the insertion and removal directions can be miniaturized.

The lock structure 1 can be applied to, for example, an electric connection box for accommodating an electronic component, an electric connection box which accommodates the electronic component and an electric wire and forms a wire harness together with the electric wire drawn outward, and the like. Here, the lock structure 1 applied to an electric connection box 100 (FIG. 12) forming the wire harness WH is illustrated.

Figure 12:
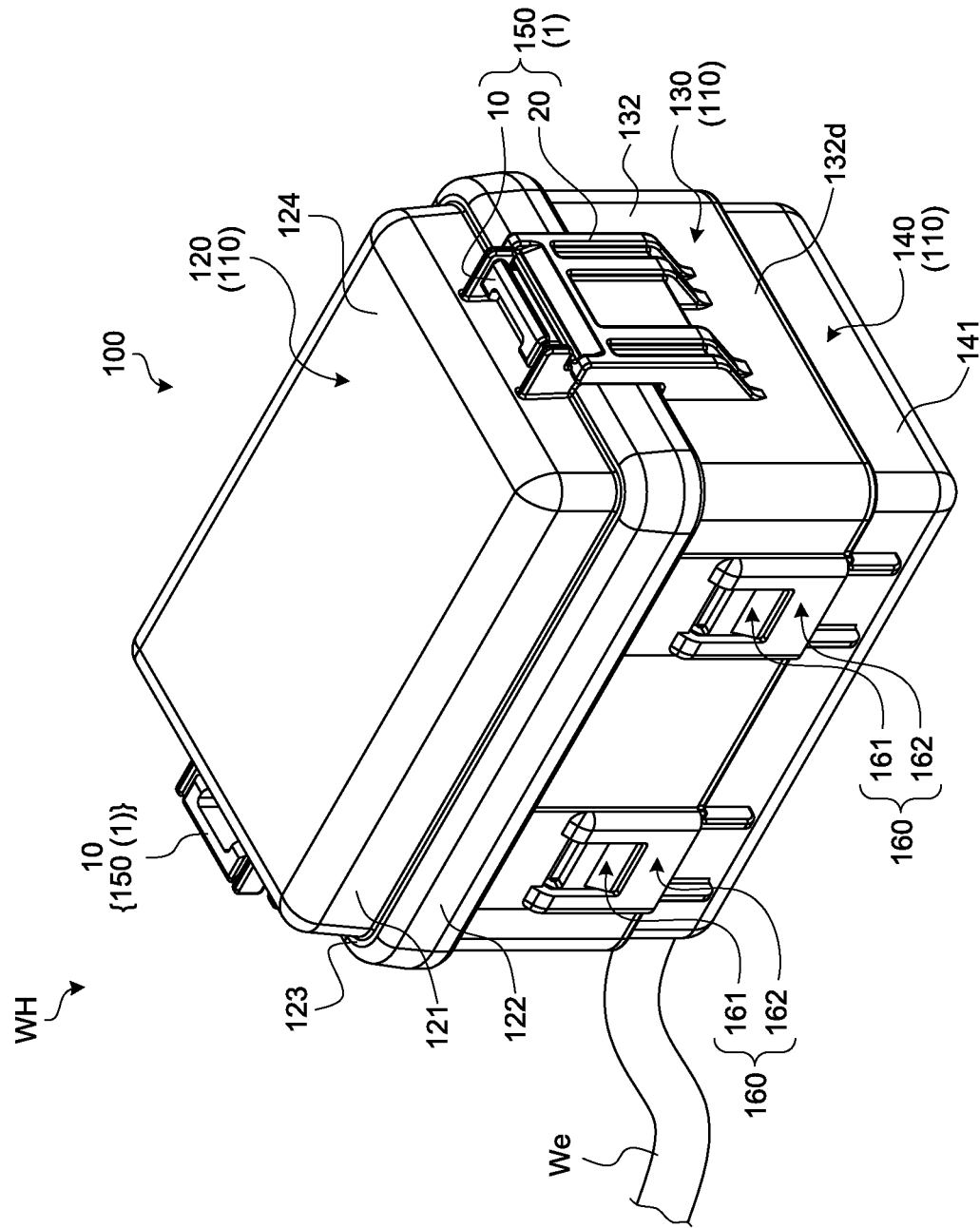
FIG. 12 is a perspective view illustrating an electric connection box and a wire harness to which the lock structure of the embodiment is applied.

The electric connection box 100 includes a housing 110 that accommodates an electronic component (not illustrated) therein. An electric wire We electrically connected to the electronic component therein is also accommodated in the housing 110 of this example, and the electric wire We is drawn outward from the inside (FIG. 12). The electric connection box 100 electrically connects a connection target (not illustrated) to the electronic component via the electric wire We. In the electric connection box 100, the electronic component is electrically connected to the connection target via the electric wire We drawn outward from the inside of the housing 110.

The electronic components refer to, for example, a circuit protection component such as a relay and a fuse, a connector, a terminal fitting, and the like. Here, electronic devices such as a circuit board and an electronic control unit (so-called ECU) are also considered as a form of the electronic components. Further, the connection target refers to a power supply such as a secondary battery, a load such as an electric device (an actuator or the like), a sensor, and the like. In the electric connection box 100, for example, one electric wire We is electrically connected to the power supply, another electric wire We is electrically connected to the load, and the power supply and the load are electrically connected to each other via the electronic components.

Figure 13:
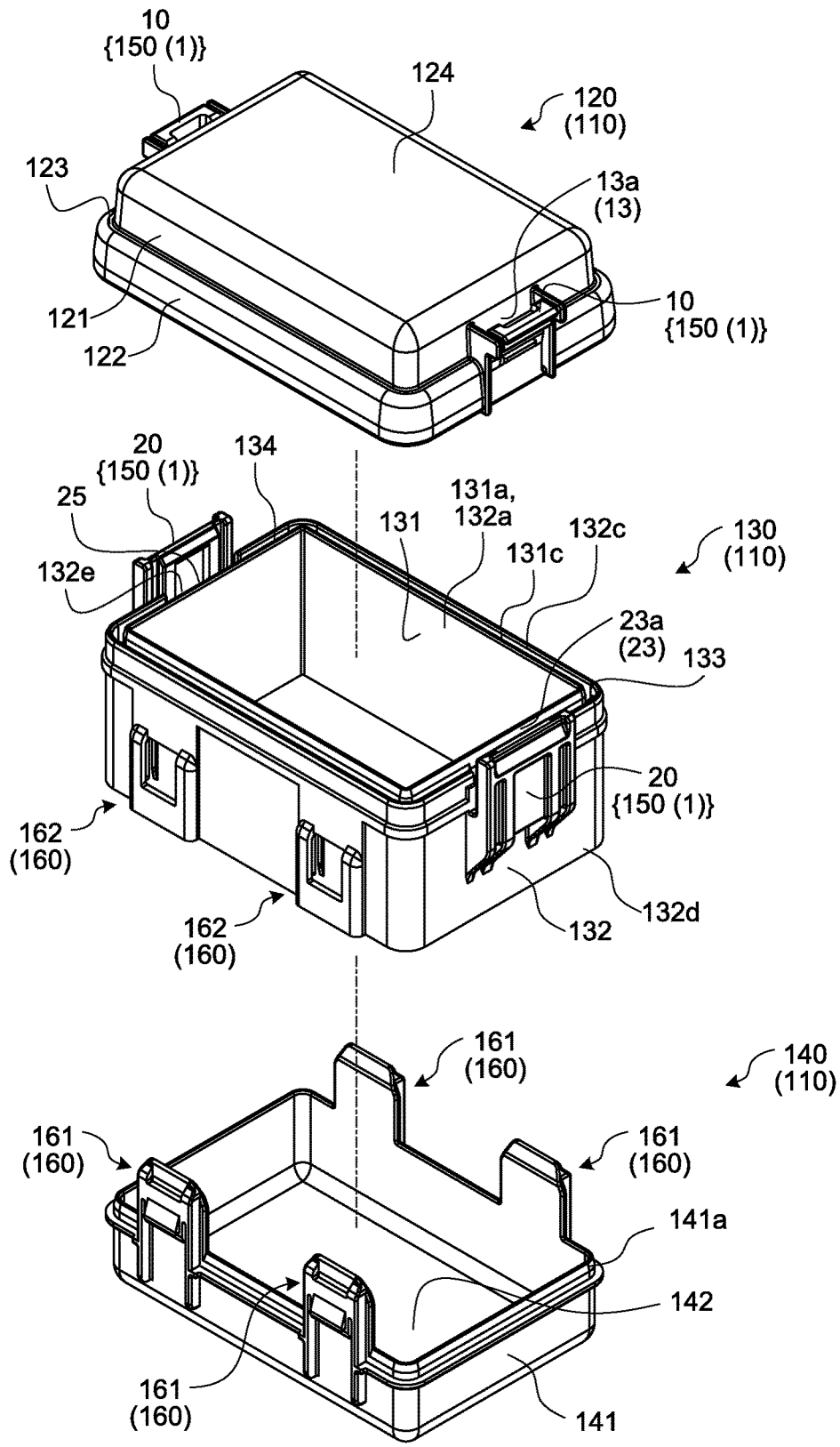
FIG. 13 is an exploded perspective view of a housing of the electric connection box.
Figure 14:
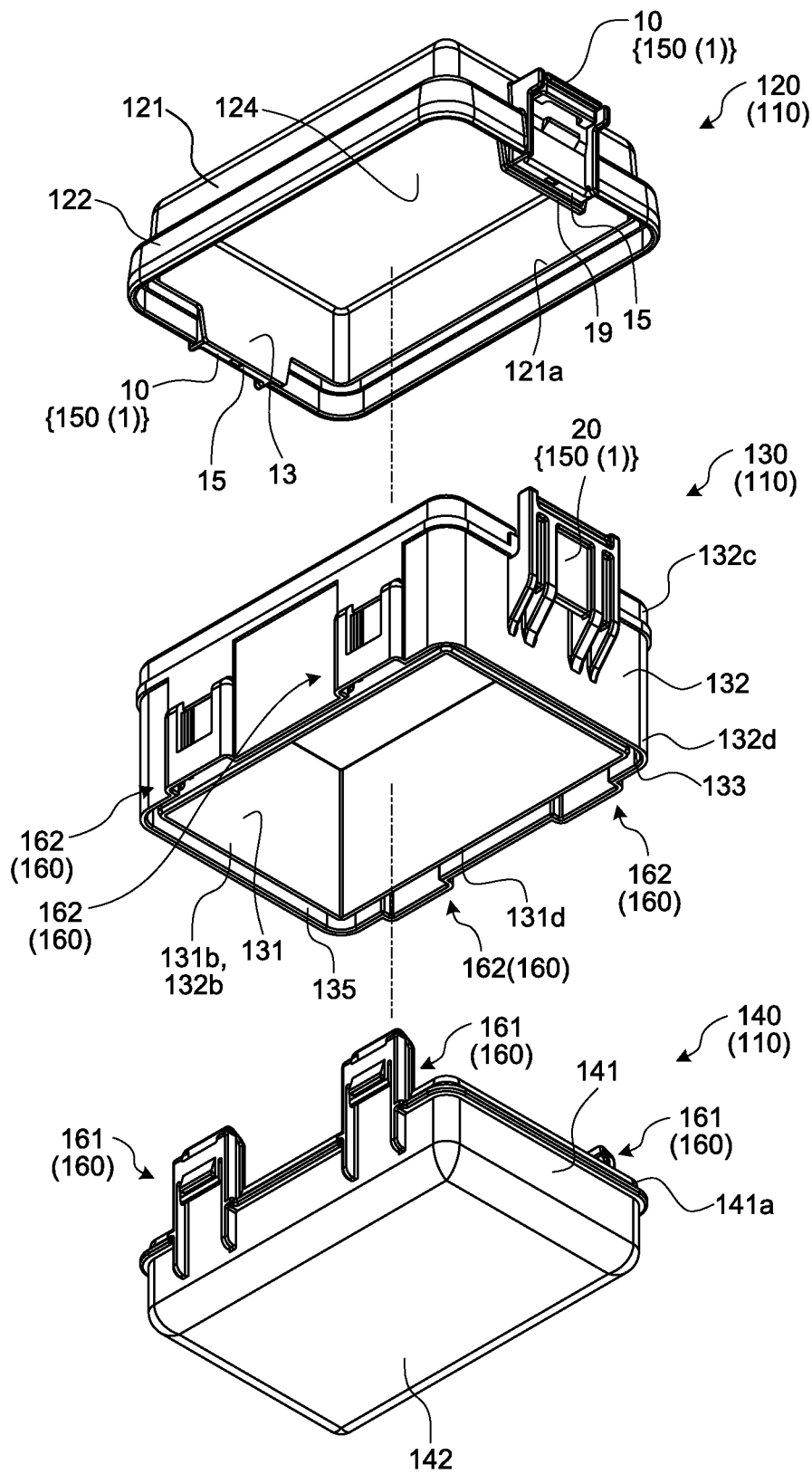
FIG. 14 is an exploded perspective view of the housing of the electric connection box as viewed from another angle.

The housing 110 is formed of an insulating material such as a synthetic resin. The housing 110 has at least first and second fitting members 120 and 130 to be fitted to each other (FIGS. 12 to 14). The housing 110 of this example further has a third fitting member 140 (FIGS. 12 to 14). The first fitting member 120, the second fitting member 130, and the third fitting member 140 are disposed in the housing 110 in that order. The housing 110 is formed by fitting the first fitting member 120 and the second fitting member 130, and by fitting the second fitting member 130 and the third fitting member 140.

In the housing 110 of this example, the middle second fitting member 130 is formed into a tubular shape, one opening of the second fitting member 130 is closed by the first fitting member 120, and the other opening of the second fitting member 130 is closed by the third fitting member 140. Here, the second fitting member 130 is a frame serving as the main body of the housing 110, and the first fitting member 120 and the third fitting member 140 serve as cover members for closing the opening of the second fitting member 130. For example, the housing 110 mounts the two openings of the second fitting member 130 disposed opposite to each other on a vehicle in a vertical direction of the vehicle. One of the first fitting member 120 and the third fitting member 140 may be a lower cover or an upper cover. Here, for convenience, the first fitting member 120 is defined as a lower cover, and the third fitting member 140 is defined as an upper cover.

The second fitting member 130 has a cylindrical first peripheral wall body 131 forming an inner wall, and a cylindrical second peripheral wall body 132 forming an outer wall (FIGS. 13 and 14). The first peripheral wall body 131 and the second peripheral wall body 132 are formed by arranging and connecting a plurality of flat plate-like wall bodies, the numbers of which are the same, in a circumferential direction, respectively. The second fitting member 130 is a double-walled structure in which the first peripheral wall body 131 and the second peripheral wall body 132 are disposed with the cylinder axial directions aligned in the same direction. The wall bodies of each of the first peripheral wall body 131 and the second peripheral wall body 132 are disposed opposite to each other at an interval. Therefore, in the second fitting member 130, a space having a cylindrical shape (hereinafter referred to as a "cylindrical space") 133 is formed between the first peripheral wall body 131 and the second peripheral wall body 132 (FIGS. 13 and 14). Further, in the second fitting member 130, one or a plurality of accommodation chambers is formed inside the first peripheral wall body 131, and the electronic components and the electric wires We are accommodated in the accommodation chambers.

The first peripheral wall body 131 has two openings 131a and 131b disposed opposite to each other (FIGS. 13 and 14). In addition, the second peripheral wall body 132 has two openings 132a and 132b disposed opposite to each other (FIGS. 13 and 14). In the second fitting member 130, a peripheral edge portion (hereinafter, referred to as an "opening peripheral edge portion") 131c of one opening 131a in the first peripheral wall body 131, and a peripheral edge portion (hereinafter, referred to as an "opening peripheral edge portion") 132c of one opening 132a in the second peripheral wall body 132 are disposed opposite to each other at an interval (FIG. 13). Therefore, in the second fitting member 130, one opening 131a in the first peripheral wall body 131, and an annular opening 134 between the respective one opening peripheral edge portions 131c and 132c serve as openings of the blockage target of the first fitting member 120 (FIG. 13). Further, in the second fitting member 130, a peripheral edge portion (hereinafter referred to as an "opening peripheral edge portion") 131d of the other opening 131b in the first peripheral wall body 131, and a peripheral edge portion (hereinafter, referred to as an "opening peripheral edge portion") 132d of the other opening 132b in the second peripheral wall body 132 are disposed opposite to each other at an interval (FIG. 14). Accordingly, in the second fitting member 130, the other opening 131b in the first peripheral wall body 131, and an annular opening 135 between the respective other opening peripheral edge portions 131d and 132d serve as openings of the blockage target of the third fitting member 140 (FIG. 14).

The first fitting member 120 has a cylindrical peripheral wall body (hereinafter referred to as a "main peripheral wall body") 121, a cylindrical peripheral wall body (hereinafter referred to as a "auxiliary peripheral wall body") 122, a connection wall body 123 which connects the main peripheral wall body 121 and the auxiliary peripheral wall body 122, and a closing body 124 which closes one opening of the main peripheral wall body 121 (FIGS. 12 and 13).

In the main peripheral wall body 121 and the auxiliary peripheral wall body 122, a plurality of flat plate-like wall bodies connected side by side in the circumferential direction is disposed to correspond to a plurality of flat plate-like wall bodies in the first peripheral wall body 131 and the second peripheral wall body 132. The main peripheral wall body 121 and the auxiliary peripheral wall body 122 form a double-walled structure in which the cylinder axial directions are aligned in the same direction, and the main peripheral wall body 121 and the auxiliary peripheral wall body 122 are disposed opposite to each other at an interval.

In the first fitting member 120, the peripheral edge portion (hereinafter referred to as an "opening peripheral edge portion") 121a (FIG. 14) of the other opening is inserted and fitted into the cylindrical space 133 from the opening 134 of the second fitting member 130. The opening peripheral edge portion 121a is sandwiched by one opening peripheral edge portion 131c of the first peripheral wall body 131 and one opening peripheral edge portion 132c of the second peripheral wall body 132 in the second fitting member 130, along with the insertion fitting. In the first fitting member 120 and the second fitting member 130, when in the fitted state, the inner wall surface of the opening peripheral edge portion 121a of the main peripheral wall body 121 and the outer wall surface of one opening peripheral edge portion 131c of the first peripheral wall body 131 are disposed opposite to each other, and the outer wall surface of the opening peripheral edge portion 121a of the main peripheral wall body 121 and the inner wall surface of the one opening peripheral edge portion 132c of the second peripheral wall body 132 are disposed opposite to each other.

The auxiliary peripheral wall body 122 is disposed opposite to the outer wall surface of the opening peripheral edge portion 121a at an interval. The auxiliary peripheral wall body 122 is connected to the outer wall surface of the main peripheral wall body 121 via the connection wall body 123, on the side closer to the closing body 124 than the opening peripheral edge portion 121a of the main peripheral wall body 121. The connection wall body 123 is an annular wall body protruding from the outer wall surface of the main peripheral wall body 121. The connection wall body 123 of this example is vertically provided on the outer wall surface of the main peripheral wall body 121. The auxiliary peripheral wall body 122 is connected to the end portion of the connection wall body 123 on the protruding direction side.

In the first fitting member 120, when the opening peripheral edge portion 121a is inserted and fitted into the cylindrical space 133 of the second fitting member 130, one opening peripheral edge portion 132c of the second peripheral wall body 132 is inserted and fitted between the outer wall surface of the opening peripheral edge portion 121a of the main peripheral wall body 121 and the inner wall surface of the auxiliary peripheral wall body 122.

The third fitting member 140 has a cylindrical peripheral wall body 141, and a closing body 142 that closes one opening of the peripheral wall body 141 (FIGS. 13 and 14). In the peripheral wall body 141, a plurality of flat plate-like wall bodies connected side by side in the circumferential direction is disposed to correspond to a plurality of flat plate-like wall bodies in the first peripheral wall body 131 and the second peripheral wall body 132. In the third fitting member 140, the peripheral edge portion (hereinafter referred to as an "opening peripheral edge portion") 141a (FIGS. 13 and 14) of the other opening in the peripheral wall body 141 is inserted into the cylindrical space 133 from the opening 135 of the second fitting member 130. Thus, the opening peripheral edge portion 141a is fitted to the gap between the opening peripheral edge portion 131d and the opening peripheral edge portion 132d in the second fitting member 130.

The housing 110 has a first lock structure 150 that holds the fitted state of the first and second fitting members 120 and 130, and a second lock structure 160 that holds the fitted state of the second and third fitting members 130 and 140 (FIGS. 12 to 14).

Here, the lock structure 1 illustrated above is applied to the first lock structure 150. In the first lock structure 150 (the lock structure 1), the engaged body 10 is provided on the first fitting member 120, and the engaging body 20 is provided on the second fitting member 130.

The engaged body 10 is provided on the outer wall surface side of the main peripheral wall body 121 in the first fitting member 120 (FIGS. 13 and 14). In the first fitting member 120 of this example, the engaged body 10 is provided at two locations on the outer wall surface side of the main peripheral wall body 121.

Specifically, the engaged body 10 forms the first engaged wall 13, using a part of the main peripheral wall body 121 in the first fitting member 120 (FIG. 13). Therefore, the inner wall surface 13a of the first engaged wall 13 is disposed on the same plane as the outer wall surface of the main peripheral wall body 121. The engaged body 10 makes the connection wall 15 side of the first engaged wall 13 protrude to the insertion direction side of the end surface of the opening peripheral edge portion 121a of the main peripheral wall body 121 (FIG. 14).

The engaging body 20 is provided on the first peripheral wall body 131 and the second peripheral wall body 132 of the second fitting member 130 (FIGS. 13 and 14). In the second fitting member 130 of this example, the engaging bodies 20 are provided at two locations of the first peripheral wall body 131 and the second peripheral wall body 132 disposed opposite to each other.

Specifically, the engaging body 20 forms the first engaging wall 23, using a part of the first peripheral wall body 131 (FIG. 13). Therefore, the inner wall surface 23a of the first engaging wall 23 is disposed on the same plane as the outer wall surface of the first peripheral wall body 131. Further, the engaging body 20 forms an accommodation space 25 by a rectangular notch 132e obtained by notching a part of one opening peripheral edge portion 132c of the second peripheral wall body 132 (FIG. 13). Further, the engaging body 20 forms the third engaging wall 26, using the insertion direction side of the notch 132e in the second peripheral wall body 132. Therefore, the locker 26a of the third engaging wall 26 is formed, using the peripheral wall surface on the insertion direction side of the notch 132e of the second peripheral wall body 132.

In the housing 110, since the first lock structure 150 (the lock structure 1) is provided as described above, the liquid W going straight from various directions toward the part between the wall surface 15a of the connection wall 15 and the locker 26a and the gap G formed between them can be blocked by the second engaging wall 24. Therefore, in the housing 110, it is possible to suppress the entry of the liquid W to the part between the wall surface 15a of the connection wall 15 and the locker 26a and the gap G formed between them, and to suppress the entry of the liquid W into the inner accommodation chamber.

Further, in the housing 110, the liquid W flowing along the wall surface 26b of the third engaging wall 26 can be blocked by the liquid-proof protrusion 26c. Therefore, in the housing 110, it is possible to suppress the entry of the liquid W to the part between the wall surface 15a of the connection wall 15 and the locker 26a and the gap G formed between them and to suppress the entry of the liquid W to the inner accommodation chamber.

In addition, in the housing 110, the liquid W having entered the gap G can be blocked by the guide protrusion 19 and guided to the second space 25b. Therefore, in the housing 110, the liquid W having entered the gap G can be suppressed from entering the first space 25a. In the housing 110, the first space 25a is connected to the inner accommodation chamber via the end surface of one opening peripheral edge portion 131c of the first peripheral wall body 131.

Therefore, in the housing 110, the liquid W cannot get over the one opening peripheral edge portion 131c of the first peripheral wall body 131, and it is possible to suppress the entry of the liquid W into the inner accommodation chamber through the first space 25a. Furthermore, in the housing 110, the liquid W guided to the second space 25b by the guide protrusion 19 can be guided by gravity along the wall surface 26d of the third engaging wall 26, and the liquid W can be discharged to the outside of the housing 110 from the gap between the opening peripheral edge portion 132d of the second peripheral wall body 132 of the second fitting member 130 and the opening peripheral edge portion 141a of the third fitting member 140. Therefore, in the housing 110 as well, from this point, it is also possible to suppress the entry of the liquid W having entered the gap G into the inner accommodation chamber.

Furthermore, in the housing 110, the first engaged wall 13 of the engaged body 10 is formed, using a part of the main peripheral wall body 121 of the first fitting member 120, and the first engaging wall 23 of the engaging body 20 is formed, using a part of the first peripheral wall body 131 in the second fitting member 130. Therefore, in the housing 110, the amount of protrusion of the first lock structure 150 (the lock structure 1) from the outer wall surface side can be reduced as compared with the conventional case. Therefore, the physique of the housing 110 can be miniaturized.

As described above, the lock structure 1, the electric connection box 100, and the wire harness WH of the present embodiment can suppress the entry of the liquid W into the inner accommodation chamber of the housing 110. Therefore, since the lock structure 1, the electric connection box 100, and the wire harness WH can suppress the performance deterioration associated with the entry of the liquid W with respect to the electronic components and the like stored in the accommodation chamber, the durability can be improved.

The lock structure according to the present embodiment can block the liquid, which has advanced straight from various directions toward a part between the connection wall and the locker and a gap formed between them, with the second engaging wall. Therefore, since the lock structure can inhibit the liquid from entering the part between the connection wall and the locker and the gap formed between them, for example, it is possible to suppress the entry of the liquid into the internal space of the first and second fitting members through the gap. Further, the electric connection box and the wire harness according to the present invention have the lock structure, and can obtain the same effect as that of the lock structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lock structure comprising:
an engaged body; and
an engaging body capable of inserting and removing the engaged body along insertion and removal directions opposite to each other, and capable of locking the inserted engaged body in the insertion direction and the removal direction, respectively, wherein
the engaged body has first and second engaged walls disposed opposite to each other at an interval in an orthogonal direction to the insertion and removal directions, a connection wall that connects end portions on the insertion direction side of the first and second engaged walls, and an engaged protrusion protruding from an outer wall surface of the second engaged wall,
the engaging body has first and second engaging walls that are disposed opposite to each other at an interval in an opposite arrangement direction of the first and second engaged walls and in which a space between respective inner wall surfaces is defined as an accommodation space of the engaged body, an engaging protrusion protruding from the inner wall surface of the second engaging wall and capable of locking the engaged protrusion on the removal direction side when the engaged body inserted into the accommodation space from the connection wall side is in an accommodated state, and a third engaging wall disposed opposite to the respective inner wall surfaces at an interval between the first and second engaging walls,
the third engaging wall has a locker capable of locking the connection wall on the insertion direction side when in the accommodated state, and
the second engaging wall has a shape and arrangement capable of blocking liquid going straight from the outside toward a part between the connection wall and the locker disposed opposite to each other in the insertion and removal directions when in the accommodated state.

2. The lock structure according to claim 1, wherein the connection wall, the second engaging wall, and the third engaging wall are formed and disposed so that the part between the connection wall and the locker disposed opposite to each other in the insertion and removal directions when in the accommodated state overlaps the second engaging wall in the opposite arrangement direction.

3. The lock structure according to claim 1, wherein the third engaging wall has a liquid-proof protrusion protruding toward the inner wall surface of the second engaging wall on the insertion direction side of the part between the connection wall and the locker disposed opposite to each other in the insertion and removal directions when in the accommodated state, and
the liquid-proof protrusion extends over a length range of a longer length in orthogonal directions to the insertion and removal directions and the opposite arrangement direction, in the connection wall and the locker disposed opposite to each other in the insertion and removal directions when in the accommodated state.

4. The lock structure according to claim 2, wherein the third engaging wall has a liquid-proof protrusion protruding toward the inner wall surface of the second engaging wall on the insertion direction side of the part between the connection wall and the locker disposed opposite to each other in the insertion and removal directions when in the accommodated state, and
the liquid-proof protrusion extends over a length range of a longer length in orthogonal directions to the insertion and removal directions and the opposite arrangement direction, in the connection wall and the locker disposed opposite to each other in the insertion and removal directions when in the accommodated state.

5. The lock structure according to claim 1, wherein the engaged body has a guide protrusion that is connected to the connection wall, protrudes in the insertion direction side, and is disposed between the first engaging wall and the third engaging wall when in the accommodated state, and the guide protrusion extends over a length range of a longer length in the orthogonal directions to the insertion and removal directions and the opposite arrangement direction, in the connection wall and the locker disposed opposite to each other in the insertion and removal directions when in the accommodated state.

6. The lock structure according to claim 2, wherein
the engaged body has a guide protrusion that is connected to the connection wall, protrudes in the insertion direction side, and is disposed between the first engaging wall and the third engaging wall when in the accommodated state, and
the guide protrusion extends over a length range of a longer length in the orthogonal directions to the insertion and removal directions and the opposite arrangement direction, in the connection wall and the locker disposed opposite to each other in the insertion and removal directions when in the accommodated state.

7. The lock structure according to claim 3, wherein
the engaged body has a guide protrusion that is connected to the connection wall, protrudes in the insertion direction side, and is disposed between the first engaging wall and the third engaging wall when in the accommodated state, and
the guide protrusion extends over a length range of a longer length in the orthogonal directions to the insertion and removal directions and the opposite arrangement direction, in the connection wall and the locker disposed opposite to each other in the insertion and removal directions when in the accommodated state.

8. The lock structure according to claim 4, wherein
the engaged body has a guide protrusion that is connected to the connection wall, protrudes in the insertion direction side, and is disposed between the first engaging wall and the third engaging wall when in the accommodated state, and
the guide protrusion extends over a length range of a longer length in the orthogonal directions to the insertion and removal directions and the opposite arrangement direction, in the connection wall and the locker disposed opposite to each other in the insertion and removal directions when in the accommodated state.

9. The lock structure according to claim 1, wherein
the engaged body is provided on an outer wall surface side of a peripheral wall body of a first fitting member, and forms the first engaged wall, using a part of the peripheral wall body of the first fitting member,
the engaging body is provided on a first peripheral wall body of a second fitting member having an opening peripheral edge portion disposed opposite to the inner wall surface of the opening peripheral edge portion in the peripheral wall body of the first fitting member, and a second peripheral wall body of the second fitting member having an opening peripheral edge portion disposed opposite to the outer wall surface of the opening peripheral edge portion of the peripheral wall body,
the first engaging wall is formed, using a part of the first peripheral wall body,
the accommodation space is formed by a notch formed by notching a part of the opening peripheral edge portion of the second peripheral wall body, and
the third engaging wall is formed, using the insertion direction side of the notch of the second peripheral wall body.

10. The lock structure according to claim 2, wherein
the engaged body is provided on an outer wall surface side of a peripheral wall body of a first fitting member, and forms the first engaged wall, using a part of the peripheral wall body of the first fitting member,
the engaging body is provided on a first peripheral wall body of a second fitting member having an opening peripheral edge portion disposed opposite to the inner wall surface of the opening peripheral edge portion in the peripheral wall body of the first fitting member, and a second peripheral wall body of the second fitting member having an opening peripheral edge portion disposed opposite to the outer wall surface of the opening peripheral edge portion of the peripheral wall body,
the first engaging wall is formed, using a part of the first peripheral wall body,
the accommodation space is formed by a notch formed by notching a part of the opening peripheral edge portion of the second peripheral wall body, and
the third engaging wall is formed, using the insertion direction side of the notch of the second peripheral wall body.

11. The lock structure according to claim 3, wherein
the engaged body is provided on an outer wall surface side of a peripheral wall body of a first fitting member, and forms the first engaged wall, using a part of the peripheral wall body of the first fitting member,
the engaging body is provided on a first peripheral wall body of a second fitting member having an opening peripheral edge portion disposed opposite to the inner wall surface of the opening peripheral edge portion in the peripheral wall body of the first fitting member, and a second peripheral wall body of the second fitting member having an opening peripheral edge portion disposed opposite to the outer wall surface of the opening peripheral edge portion of the peripheral wall body,
the first engaging wall is formed, using a part of the first peripheral wall body,
the accommodation space is formed by a notch formed by notching a part of the opening peripheral edge portion of the second peripheral wall body, and
the third engaging wall is formed, using the insertion direction side of the notch of the second peripheral wall body.

12. The lock structure according to claim 4, wherein
the engaged body is provided on an outer wall surface side of a peripheral wall body of a first fitting member, and forms the first engaged wall, using a part of the peripheral wall body of the first fitting member,
the engaging body is provided on a first peripheral wall body of a second fitting member having an opening peripheral edge portion disposed opposite to the inner wall surface of the opening peripheral edge portion in the peripheral wall body of the first fitting member, and a second peripheral wall body of the second fitting member having an opening peripheral edge portion disposed opposite to the outer wall surface of the opening peripheral edge portion of the peripheral wall body,
the first engaging wall is formed, using a part of the first peripheral wall body,
the accommodation space is formed by a notch formed by notching a part of the opening peripheral edge portion of the second peripheral wall body, and the third engaging wall is formed, using the insertion direction side of the notch of the second peripheral wall body.

13. The lock structure according to claim 5, wherein
the engaged body is provided on an outer wall surface side of a peripheral wall body of a first fitting member, and forms the first engaged wall, using a part of the peripheral wall body of the first fitting member,
the engaging body is provided on a first peripheral wall body of a second fitting member having an opening peripheral edge portion disposed opposite to the inner wall surface of the opening peripheral edge portion in the peripheral wall body of the first fitting member, and a second peripheral wall body of the second fitting member having an opening peripheral edge portion disposed opposite to the outer wall surface of the opening peripheral edge portion of the peripheral wall body,
the first engaging wall is formed, using a part of the first peripheral wall body,
the accommodation space is formed by a notch formed by notching a part of the opening peripheral edge portion of the second peripheral wall body, and
the third engaging wall is formed, using the insertion direction side of the notch of the second peripheral wall body.

14. The lock structure according to claim 6, wherein
the engaged body is provided on an outer wall surface side of a peripheral wall body of a first fitting member, and forms the first engaged wall, using a part of the peripheral wall body of the first fitting member,
the engaging body is provided on a first peripheral wall body of a second fitting member having an opening peripheral edge portion disposed opposite to the inner wall surface of the opening peripheral edge portion in the peripheral wall body of the first fitting member, and a second peripheral wall body of the second fitting member having an opening peripheral edge portion disposed opposite to the outer wall surface of the opening peripheral edge portion of the peripheral wall body,
the first engaging wall is formed, using a part of the first peripheral wall body,
the accommodation space is formed by a notch formed by notching a part of the opening peripheral edge portion of the second peripheral wall body, and
the third engaging wall is formed, using the insertion direction side of the notch of the second peripheral wall body.

15. The lock structure according to claim 7, wherein
the engaged body is provided on an outer wall surface side of a peripheral wall body of a first fitting member, and forms the first engaged wall, using a part of the peripheral wall body of the first fitting member,
the engaging body is provided on a first peripheral wall body of a second fitting member having an opening peripheral edge portion disposed opposite to the inner wall surface of the opening peripheral edge portion in the peripheral wall body of the first fitting member, and a second peripheral wall body of the second fitting member having an opening peripheral edge portion disposed opposite to the outer wall surface of the opening peripheral edge portion of the peripheral wall body,
the first engaging wall is formed, using a part of the first peripheral wall body,
the accommodation space is formed by a notch formed by notching a part of the opening peripheral edge portion of the second peripheral wall body, and
the third engaging wall is formed, using the insertion direction side of the notch of the second peripheral wall body.

16. The lock structure according to claim 8, wherein
the engaged body is provided on an outer wall surface side of a peripheral wall body of a first fitting member, and forms the first engaged wall, using a part of the peripheral wall body of the first fitting member,
the engaging body is provided on a first peripheral wall body of a second fitting member having an opening peripheral edge portion disposed opposite to the inner wall surface of the opening peripheral edge portion in the peripheral wall body of the first fitting member, and a second peripheral wall body of the second fitting member having an opening peripheral edge portion disposed opposite to the outer wall surface of the opening peripheral edge portion of the peripheral wall body,
the first engaging wall is formed, using a part of the first peripheral wall body,
the accommodation space is formed by a notch formed by notching a part of the opening peripheral edge portion of the second peripheral wall body, and
the third engaging wall is formed, using the insertion direction side of the notch of the second peripheral wall body.

17. An electric connection box comprising:
a housing that accommodates electronic component in the housing, wherein
the housing has at least first and second fitting members to be fitted to each other, and has a lock structure that holds a fitted state of the first and second fitting members,
the lock structure includes an engaged body provided on the first fitting member, and an engaging body provided on the second fitting member, capable of inserting and removing the engaged body in insertion and removal directions opposite to each other, and capable of locking the inserted engaged body in the insertion direction and the removal direction, respectively,
the engaged body has first and second engaged walls disposed opposite to each other at an interval in an orthogonal direction to the insertion and removal directions, a connection wall that connects end portions on the insertion direction side of the first and second engaged walls, and an engaged protrusion protruding from an outer wall surface of the second engaged wall,
the engaging body has first and second engaging walls that are disposed opposite to each other at an interval in an opposite arrangement direction of the first and second engaged walls and in which a space between respective inner wall surfaces is defined as an accommodation space of the engaged body, an engaging protrusion protruding from the inner wall surface of the second engaging wall and capable of locking the engaged protrusion on the removal direction side when the engaged body inserted into the accommodation space from the connection wall side is in an accommodated state, and a third engaging wall disposed opposite to the respective inner wall surfaces at an interval between the first and second engaging walls,
the third engaging wall has a locker capable of locking the connection wall on the insertion direction side when in the accommodated state, and the second engaging wall has a shape and arrangement capable of blocking liquid going straight from the outside toward a part between the connection wall and the locker disposed opposite to each other in the insertion and removal directions when in the accommodated state.

18. An apparatus comprising:

an electronic component;

an electric wire electrically connected to the electronic component; and a housing that accommodates the electronic component and the electric wire in the housing and draws the electric wire to an outer side from an inner side, wherein the housing has at least first and second fitting members to be fitted to each other, and has a lock structure that holds a fitted state of the first and second fitting members, the lock structure includes an engaged body provided on the first fitting member, and an engaging body provided on the second fitting member, capable of inserting and removing the engaged body in insertion and removal directions opposite to each other, and capable of locking the inserted engaged body in the insertion direction and the removal direction, respectively, the engaged body has first and second engaged walls disposed opposite to each other at an interval in an orthogonal direction to the insertion and removal directions, a connection wall which connects end portions on the insertion direction side of the first and second engaged walls, and an engaged protrusion protruding from an outer wall surface of the second engaged wall, the engaging body has first and second engaging walls that are disposed opposite to each other at an interval in an opposite arrangement direction of the first and second engaged walls and in which a space between respective inner wall surfaces is defined as an accommodation space of the engaged body, an engaging protrusion protruding from the inner wall surface of the second engaging wall and capable of locking the engaged protrusion on the removal direction side when the engaged body inserted into the accommodation space from the connection wall side is in an accommodated state, and a third engaging wall disposed opposite to the respective inner wall surfaces at an interval between the first and second engaging walls, the third engaging wall has a locker capable of locking the connection wall on the insertion direction side when in the accommodated state, and the second engaging wall has a shape and arrangement capable of blocking liquid going straight from the outside toward a part between the connection wall and the locker disposed opposite to each other in the insertion and removal directions when in the accommodated state.

* * * * *